United States Patent
Okamoto

(10) Patent No.: US 8,111,436 B2
(45) Date of Patent: Feb. 7, 2012

(54) IMAGE-FORMING METHOD AND IMAGE-FORMING APPARATUS

(75) Inventor: Takahiro Okamoto, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 625 days.

(21) Appl. No.: 12/245,357

(22) Filed: Oct. 3, 2008

(65) Prior Publication Data

US 2009/0091590 A1 Apr. 9, 2009

(30) Foreign Application Priority Data

Oct. 4, 2007 (JP) .................. 2007-261097

(51) Int. Cl.
- H04N 1/46 (2006.01)
- G06F 15/00 (2006.01)
- G03G 15/10 (2006.01)
- B41J 29/38 (2006.01)
- B41J 2/205 (2006.01)

(52) U.S. Cl. ........... 358/501; 358/515; 358/1.9; 399/58; 347/6; 347/15

(58) Field of Classification Search .................. None
See application file for complete search history.

(56) References Cited

U.S. PATENT DOCUMENTS

| | | | |
|---|---|---|---|
| 6,193,366 B1 * | 2/2001 | Thomas et al. | 347/103 |
| 2005/0105111 A1 * | 5/2005 | Ott et al. | 358/1.9 |
| 2007/0091138 A1 * | 4/2007 | Hersch et al. | 347/19 |

FOREIGN PATENT DOCUMENTS

| | | |
|---|---|---|
| EP | 0 662 765 A2 | 7/1995 |
| JP | 5-006033 A | 1/1993 |
| JP | 8-060054 A | 3/1996 |
| JP | 2003-107231 A | 4/2003 |
| JP | 2006-123355 A | 5/2006 |
| JP | 2006-218847 A | 8/2006 |

OTHER PUBLICATIONS

European Search Report, dated Nov. 23, 2010, issued in Application No. 08017418.8.

* cited by examiner

*Primary Examiner* — Twyler Haskins
*Assistant Examiner* — Barbara Reinier
(74) *Attorney, Agent, or Firm* — Sughrue Mion, PLLC

(57) ABSTRACT

An image-forming method of recording an image of plural pixels by a recording means using an image-forming material not completely permeating into a recording medium and capable of forming an image with a thickness is provided. An image-forming material which is scarcely absorbed by a recording medium and which can be cured with keeping a certain thickness after formation of an image is used, and the existing thickness calculated in the step of existing thickness-calculating step is brought close to the intended thickness set in the intended thickness-setting step by the step of determining an application amount for each color. In the case of increasing a color (e.g., black) less influencing the color balance, the thickness is reduced and, in the case of decreasing a color (e.g., black) less influencing the color balance, the thickness is increased.

4 Claims, 7 Drawing Sheets

IMAGE-FORMING METHOD AND IMAGE-FORMING APPARATUS

This application is based on and claims priority under 35 U.S.C. §119 from Japanese Patent Application No. 2007-261097 filed Oct. 4, 2007, the entire disclosure of which is herein incorporated by reference.

BACKGROUND OF THE INVENTION

1. Field of the Invention

The present invention relates to an image-forming method for recording an image including plural pixels by using an image-forming material not completely permeating into a recording medium so as to form an image with a thickness and applying the material by material-applying means, and to an image-forming apparatus. In particular, the present invention relates to an image-forming method and an image-forming apparatus for forming a relief image by using the material.

2. Description of Related Art

As a relief image formed by a printer, there have been an image formed as a by-product of coloration in which small unevenness is in some cases formed depending upon overlapping degree of the toners in electrophotography, thus appearing like a relief image (JP-A-5-6033).

Also, as an apparatus for intentionally forming a relief image, there have been an apparatus for preventing forgery having a constitution of providing an image in an uneven portion of an optically changeable ink whereby an image appears with change in reflected light depending upon the viewing angle (JP-A-2006-123355) and an apparatus having a constitution of transferring on a transfer material a formation layer and a dying layer for hologram (JP-A-2006-218847). Further, as a technique of imparting a larger thickness to an image, there is a wall painting-like constitution of, for example, imparting unevenness to a base using gypsum or a resin material and then painting an image thereon.

In particular, a printer capable of forming an image with a larger thickness forms a relief image by imparting heat energy to an ink containing a blowing agent to form a foam, and solidifying the foam as such to provide a thickness. Such relief image technique is applied to screen printing for printing a recording medium, such as a trainer or a t-shirt, stationary, or to a base film for use in foamed prints.

This apparatus involves the environmental problem due to use of an organic solvent as a blowing agent and the problem of limitation as to material to be recorded due to heating, and there has been made the following proposal.

That is, there has been proposed an apparatus for forming an relief image by using an ink containing a light-sensitive material, a solvent capable of dissolving it, and a film-forming resin, recording an arbitrary image on a non-fluid-absorbing material to be recorded using an inkjet image-forming unit, and irradiating the recorded image with ultraviolet rays to thereby form an image based on the action of the film-forming resin to maintain the generated gas in a foam shape (JP-A-8-60054).

However, the proposal of JP-A-5-6033 is to provide a coating layer on the uneven relief so as to remove uneven appearance, and it is not performed to control the thickness of the toner relief thickness on the image side. In JP-A-2006-123355, only a one-layer ink constitution is disclosed, and a multi-layer constitution is not disclosed. Also, requirement for unevenness is directed to only a monotonous thickness, and sophisticated control of relief thickness is not performed. In JP-A-2006-218847, the layer as a relief for hologram and the dye layer for expressing color are formed as different layers, and the relief layer utilizes a definite thickness, thus sophisticated thickness control not being performed. Further, with JP-A-8-60054, though thickness of the relief image is controlled at an arbitrary position thereof, the foamed state of the foam-forming gas and the thickness of the film-forming resin to be formed by inkjet ejection do not completely coincide, resulting in uneven color formation and formation of unnecessary unevenness.

SUMMARY OF THE INVENTION

An object of the invention is to provide an image-forming method and an image-forming apparatus for forming a relief image, which do not use blowing materials and are friendly to environment and which permit formation of a relief image with a desired relief amount on various materials to be recorded.

The above-mentioned object can be attained by the following constitution.

(1) An image-forming method comprising recording an image including a plurality of pixels with an image-forming material which does not completely permeate into a recording medium so as to have a thickness on the recording medium, the image-forming method further comprising:

setting an intended thickness of the image-forming material on the recording medium for each pixel;

calculating an existing thickness corresponding to an existing application amount of the image-forming material for expressing each color space coordinate component of color space data at each pixel; and determining an application amount for each color by comparing of the intended thickness with the existing thickness at each pixel to adjust the color space coordinate component so as to attain the intended thickness while keeping the same color.

As is described above, the existing thickness calculated by the step of calculating the existing thickness is brought closer to the intended thickness set by the step of setting the intended thickness by the step of determining the application amount for each color. The image-forming material is a material which is scarcely absorbed by the recording medium, and curing of the material is performed with keeping a certain thickness after application thereof Thus, a relief image can be formed with a desired relief amount on various materials to be recorded with keeping the thickness at a level of the intended thickness upon image formation in a manner friendly to the environment without using any blowing agent.

(2) The image-forming method according to above (1), wherein the intended thickness is determined by performing colorimetry of an image formed based on the color space data to convert to color space data having a luminance value as a parameter, and carrying out an operation based on the converted luminance value.

As is described above, the intended thickness is determined for a luminance value of color space data having a luminance vale as a parameter. The thickness of the image-forming material increases as the luminance value increases, and hence a calculation formula can previously be set, which enables one to specify the ejection amount of a special color place to some extent.

(3) The image-forming method according to above (1) or (2), wherein the determining of the application amount for each color includes: selecting a minimum intended thickness of a pixel having a minimum thickness and a maximum intended thickness of a pixel having a maximum thickness from thicknesses determined in the determining of the intended thickness; adjusting critical values for adjusting balance between color plates by bringing as close as possible the existing thickness to the intended thickness at each of the pixel having the minimum thickness and the pixel having the maximum thickness while keeping the same color; and adjusting a thickness at each pixel by applying to the intended thickness for each pixel an adjusting ratio determined in the adjusting of the critical values.

As is described above, selection of the minimum intended thickness and the maximum intended thickness in the image and comparison of the minimum intended thickness and the maximum intended thickness for respective pixels with existing thicknesses, respectively, which allow to bring them as close as possible, are performed, adjusting ratios are calculated, and each of the adjusting ratios are applied to the intended thickness of each pixel. In short, in the case of increasing a color (e.g., black) which exerts less influence on color balance, the thickness can be decreased whereas, in the case of reducing a color (e.g., black) which exerts less influence on color balance, the thickness can be increased. Accordingly, there can be realized a totally well-balanced thickness of the image-forming material on the recording medium.

(4) An image-forming apparatus comprising:

a material-applying section that applying an image-forming material to a recording medium to record an image including a plurality of pixels, the image-forming material not completely permeating into the medium so as to have a thickness on the recording medium;

a setting section that sets an intended thickness of the image-forming material on the recording medium for each pixel;

an existing thickness-calculating section that calculates an existing thickness corresponding to an existing application amount of the image-forming material for expressing each color space coordinate component of color space data at each pixel;

a determining section that determines an application amount for each color by comparing of the intended thickness with the existing thickness at each pixel to adjust the color space coordinate component so as to attain the intended thickness while keeping the same color; and a head-controlling section that controls the material-applying section based on the color space data adjusted in the determining section.

(5) The image-forming apparatus according to above (4), wherein the setting section includes: an inverse conversion section that performs colorimetry of an image formed based on the color space data to convert to color space data having a luminance value as a parameter: and an intended thickness-calculating section that carries out an operation based on the converted luminance value to determine the intended thickness.

(6) The image-forming apparatus according to above (4) or (5), wherein the determining section includes: a critical value-selecting section that selects a minimum intended thickness of a pixel having a minimum thickness and a maximum intended thickness of a pixel having a maximum thickness from thicknesses determined in the determining section; a critical-value adjusting section that adjusts critical values for adjusting balance between color plates by bringing as close as possible the existing thickness to the intended thickness at each of the pixel having the minimum thickness and the pixel having the maximum thickness while keeping the same color, and a thickness-adjusting section that adjusts a thickness at each pixel by applying to the intended thickness for each pixel an adjusting ratio determined in the adjusting of the critical values.

BRIEF DESCRIPTION OF THE DRAWINGS

The features of the invention will appear more fully upon consideration of the exemplary embodiments of the inventions, which are schematically set forth in the drawings, in which.

DETAILED DESCRIPTION OF THE EXEMPLARY EMBODIMENTS

According to an aspect of the invention, curing is performed with maintaining a certain thickness of the image, and hence there can be provided an image-forming method and an image-forming apparatus for forming a relief image with a desired relief amount on various media to be recorded in a manner friendly to the environment without using a blowing agent by keeping the thickness at the intended thickness level upon formation of the image.

An inkjet image-forming apparatus of the type using an active energy ray-curable ink according to an exemplary embodiment of the present invention will be described in detail by reference to the drawings.

Figure 1:
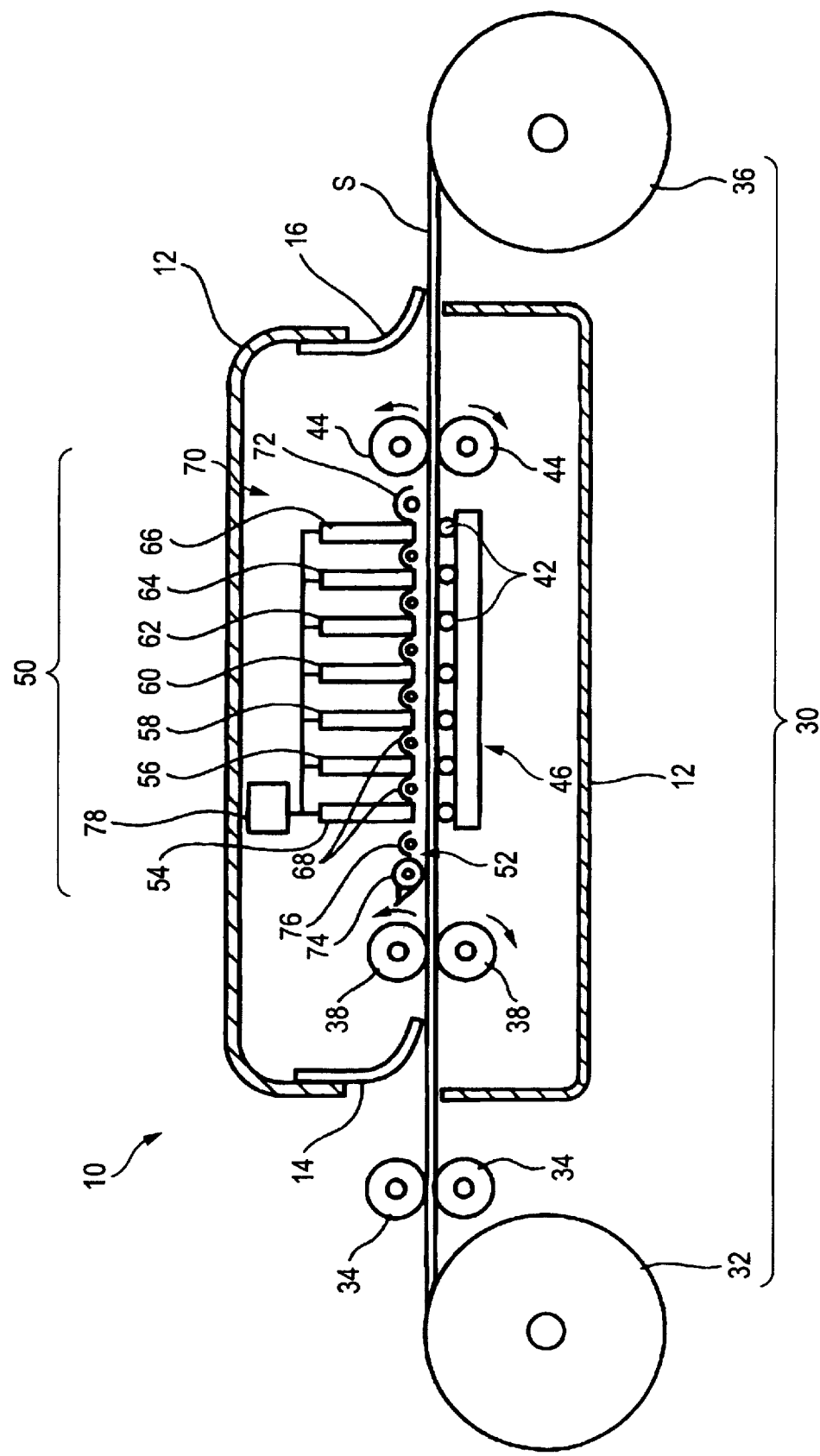
FIG. 1 is a view showing an inkjet image-forming apparatus using an active energy ray-curable ink, according to an exemplary embodiment of the invention.

FIG. 1 is a view showing an exemplary embodiment of an inkjet image-forming apparatus using an active energy ray-curable ink. FIG. 1 is a schematic view showing an inkjet image-forming apparatus of one embodiment using an active energy ray-curable ink.

The inkjet image-forming apparatus 10 of this embodiment using an active energy ray-curable ink uses a UV-curable ink capable of being cured upon irradiation with ultraviolet rays as an active energy ray-curable image-forming material.

Additionally, although this embodiment is an image-forming apparatus using an active energy ray-curable ink, other inks which are applicable to an inkjet type head may be employed in the invention.

As shown in FIG. 1, in the housing 12 of the inkjet image-forming apparatus 10 using an active energy ray-curable ink, a web-like recording medium S wound around a feed roll 32 is unwound by conveyor rollers 34, conveyed in touch with a flexible light-shielding member 14 into the housing 12. The thus-conveyed recording medium S is outputted in touch with a flexible light-shielding member 16 disposed on the opposite side of the housing 12, and then wound by a winding roll 36.

The recording medium S conveyed into the housing 12 is retained by conveying-and-retaining rollers 38 and is then fed onto plural supporting-and-conveying rollers 42. Further, the recording medium S is retained by conveying-and-retaining rollers 44 disposed on the downstream side beyond the supporting-and-conveying rollers 42, scan-conveyed on the supporting- and conveying rollers 42, and outputted in touch with the light-shielding member 16. An image-recording section 50 is disposed on the opposite side of the supporting-and-conveying rollers 42 with respect to the recording medium S. Thus, a scan-conveying unit 30 is formed by the feed roll 32, the winding roll 36, the conveying rollers 34, the conveying-and retaining rollers 38 and 44, and the supporting-and-conveying rollers 42. The plural supporting- and conveying rollers 42 are supported by a pressure-applying means 46, and this pressure-applying means 46 is movable by a driving mechanism not shown in the direction of approaching to or departing from the head units 70 in the image-recording section 50.

In the image-recording section 50, an undercoat liquid film-forming portion 52 which is a means for coating an undercoating clear ink, a head unit 70 composed of six hot cathode fluorescent lamp units 68 disposed on the downstream side of respective inkjet heads 54, 56, 58, 60, 62, and 64 and a black inkjet head 66 disposed at the most downstream position, and a final curing light source 72 are arranged in this order from the upstream side toward the downstream side with respect to the direction of conveying the recording medium S. The undercoat liquid film-forming portion 52 is equipped with a reverse gravure coater 74 which is a roll coater and an inside-curing light source 76.

In the image-recording section 50, the recording medium S which is scan-conveyed on the supporting-and-conveying rollers 42 is subjected to inkjet image recording and fixing upon irradiation with active energy rays (ultraviolet rays in this embodiment). An ink-storing portion is provided within the housing 12 for feeding an ink to each of the inkjet heads 54, 56, 58, 60, 62, 64, and 66 through feeding paths not shown within the image-recording section 50.

In the image-recording section 50, each of the inkjet heads 54, 56, 58, 60, 62, 64, and 66 of the head units 70 is disposed with the tip of its ink-ejecting portion directing toward the conveying surface of the supporting-and-conveying rollers 42, and the head units 70 constitute a full-line type head having an array in the widthwise length of the recording medium S. As the heads, piezo type heads are employed. Further, each of the head units 70 ejects an ink curable by the active energy rays towards the recording medium S. Also, a head-controlling means 78 which is an inkjet head-driving device is connected to each of the head units 70 to control the ejection amount of each color ink.

The final curing light source 72 is a metal halide lamp and is disposed on the downstream side of the head units 70.

Also, the hot cathode fluorescent lamp units 68 are paired with the head units 70 and are retained as many as the number of inks (6 sets in FIG. 1 without being provided for the black inkjet head (K) 66) by a head holder not shown and disposed in juxtaposition with each other in the downward direction to form the head unit 70. In the image-recording section 50, an ink-supplying portion not shown is connected for supplying an ink.

In FIG. 1, the active energy ray-irradiating portions 68 are provided as many as the number of the head units 70. However, it is not necessary to provide the irradiation portion for each inkjet head, and an arbitrary number of the irradiation portions may be provided. Also, it is possible that the active energy ray-irradiating portions may be different from each other in kind, amount of light, and spectrum.

Figure 2:
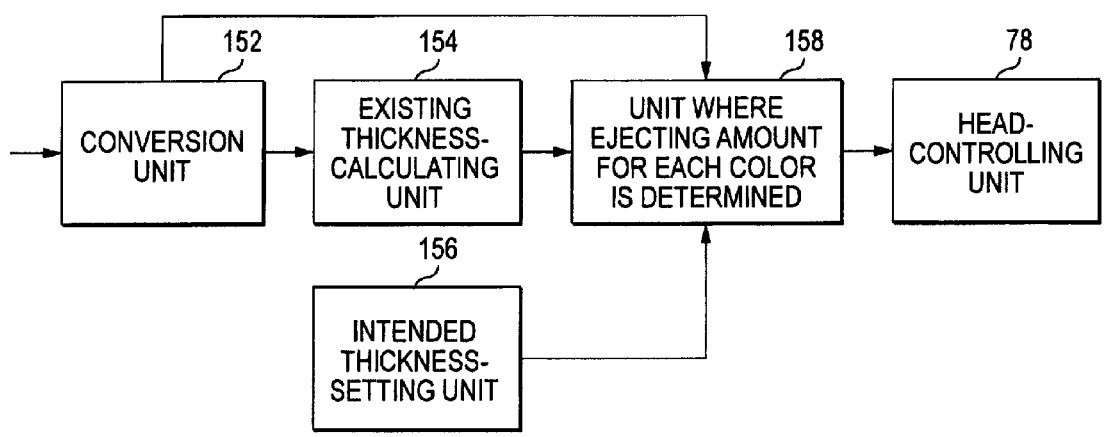
FIG. 2 is a view showing an image formation processing portion in the image-recording section 50.

FIG. 2 is a view showing an image formation processing portion contained in the image-recording section 50.

In this processing portion of image formation processing portion are contained a conversion unit 152, an existing thickness-calculating unit 154, an intended thickness-setting unit 156, and a unit 158 for determining an application amount for each color, all of which are connected to the head-controlling means 78. Operation of these units will be described below by reference to FIG. 5.

Figure 5:
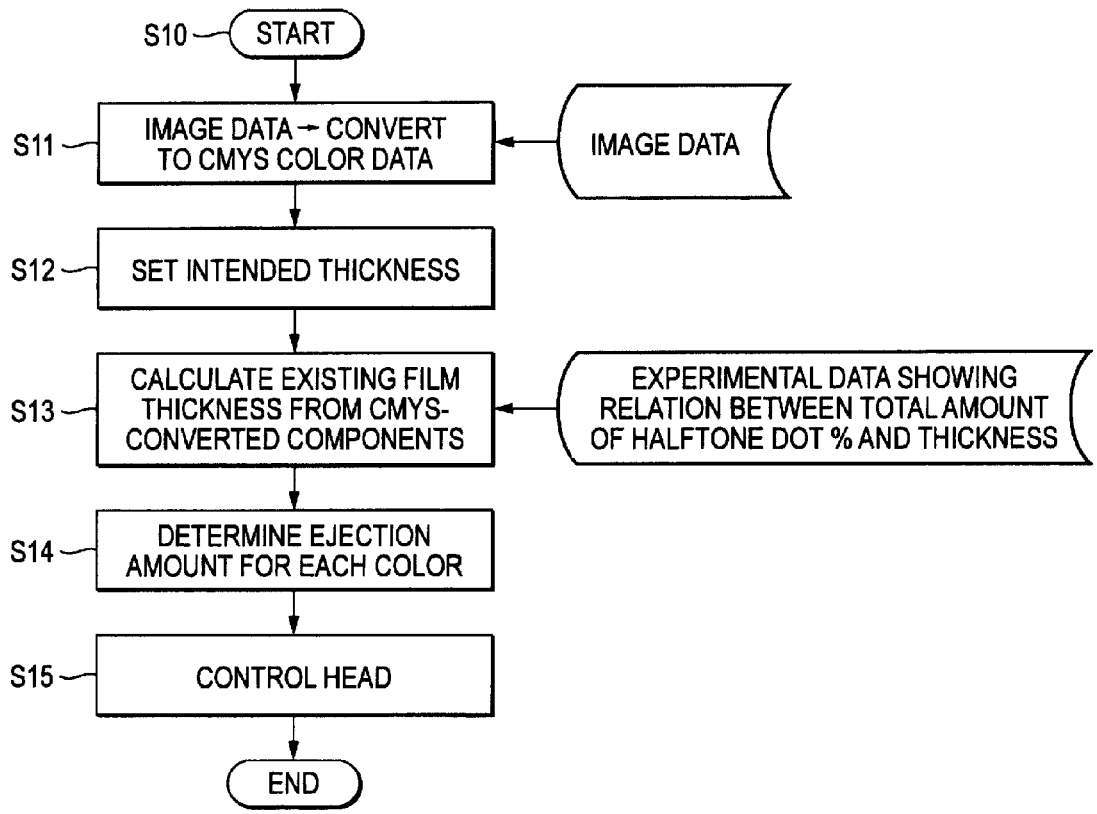
FIG. 5 is a chart diagram for illustrating operation of an image formation processing portion shown in FIG. 2.

FIG. 5 is a chart diagram for illustrating how the image formation processing unit shown in FIG. 2 operates.

When image formation processing starts at step S10, the image-recording section 50 receives image data from an external input means not shown (for example, a scanner, a digital camera or PC) and input the data into the conversion unit 152.

In the step S11, the image data inputted into the conversion unit 152 are converted therein to CMYS color space data (wherein C means cyan, M means magenta, Y means yellow, and S means special color) which can indicate ejection in the head units 70. In the inkjet image-forming apparatus 10 of this embodiment using an active energy ray-curable ink, 7 sets of inkjet heads 54, 56, 58, 60, 62, 64, and 66 are provided. For example, inkjet heads for white (W), cyan (C), magenta (M), orange (Or), violet (V), yellow (Y), and black (K), respectively, are arranged in this order. As a special color, white (W), orange (Or), violet (V), and black (K) are used. Additionally, as to the conversion, there are several conversion methods. However, since any of them can be used, they are not particularly referred to. Also, in the case where previously converted CMYS color space data are inputted, this conversion step S11 is eliminated.

In the step S12, an intended thickness of an image-forming material to be used for forming an image on the recording medium S is set for each pixel in the intended thickness-setting unit 156. Here, it is also possible to provide an input means which enables setting of the thickness for every desired area. Also, there may be employed a constitution to be described hereinafter by using FIGS. 3 and 6.

In the step S13, an existing thickness of the image-forming material specified for every pixel of the CMYS color space data is calculated from the CMYS color space coordinate component. In this occasion, relation data between total halftone dot % and thickness, which have previously been experimentally determined, are compared to obtain halftone dot % of CMYS from the CMYS color space coordinate component, and the total halftone dot % is calculated, followed by determining the existing thickness of each pixel by comparing with the experimental data.

In the step S14, the intended thickness set in the step S12 is compared with the existing thickness determined in the step S13 at every pixel in the unit 158 for determining the amount of each color, and adjustment of the CMYS space coordinate component from the conversion unit 152 is performed so as to obtain an image having an intended thickness with maintaining the same color, thus a final ejection amount for each pixel being determined.

Here, in the case where an intended thickness of the image-forming material for each pixel is set based on the thickness previously set for desired area range on the image, the following procedure is performed.

(a) In the case where the existing thickness<the intended thickness: adjustment of reducing a special color plate and increasing CMY plates among CMYS plates is performed.

(b) In the case where the existing thickness>the intended thickness: the adjustment is performed in the order reverse to that in (a).

In the step S15, the head-controlling unit 78 controls ejection in the head units 70 according to the CMYS color space coordinate component having been adjusted for each pixel in the step S14.

As described above, the existing thickness calculated by the existing thickness-calculating unit 154 is adjusted to the intended thickness to be set by the intended thickness-setting unit 156 by the processing in the unit 158 for determining the application amount for each color. Thus, the image-forming material is scarcely absorbed by the recording medium S, and is cured immediately after ejection by the active energy rays with keeping a certain degree of thickness. Therefore, upon formation of the image, the thickness can be brought close to the desired relief thickness with keeping the thickness as an intended thickness. Further, only an image-forming material for forming the image is used, and a relief image can be formed with a desired relief amount on various recording materials in the manner friendly to the environment without using any blowing agent.

Next, one example of setting the intended thickness is illustrated by reference to FIGS. 3 and 6.

Figure 3:
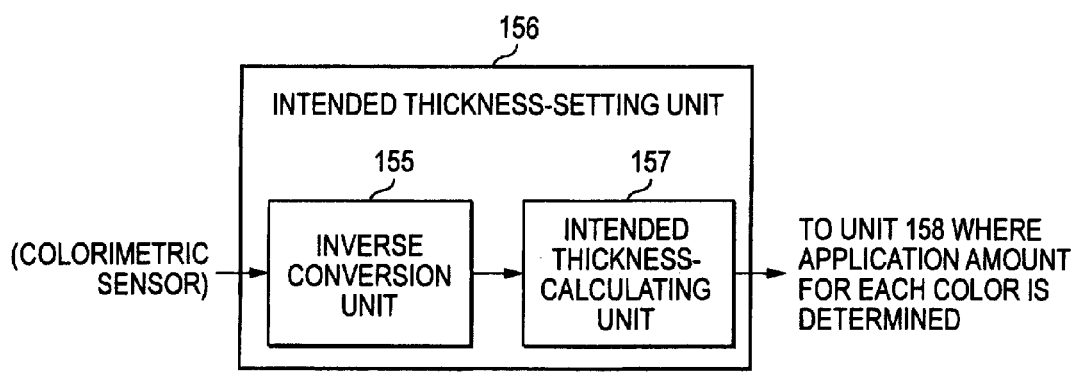
FIG. 3 is a view showing a partial constitution of an intended thickness-setting portion.
Figure 6:
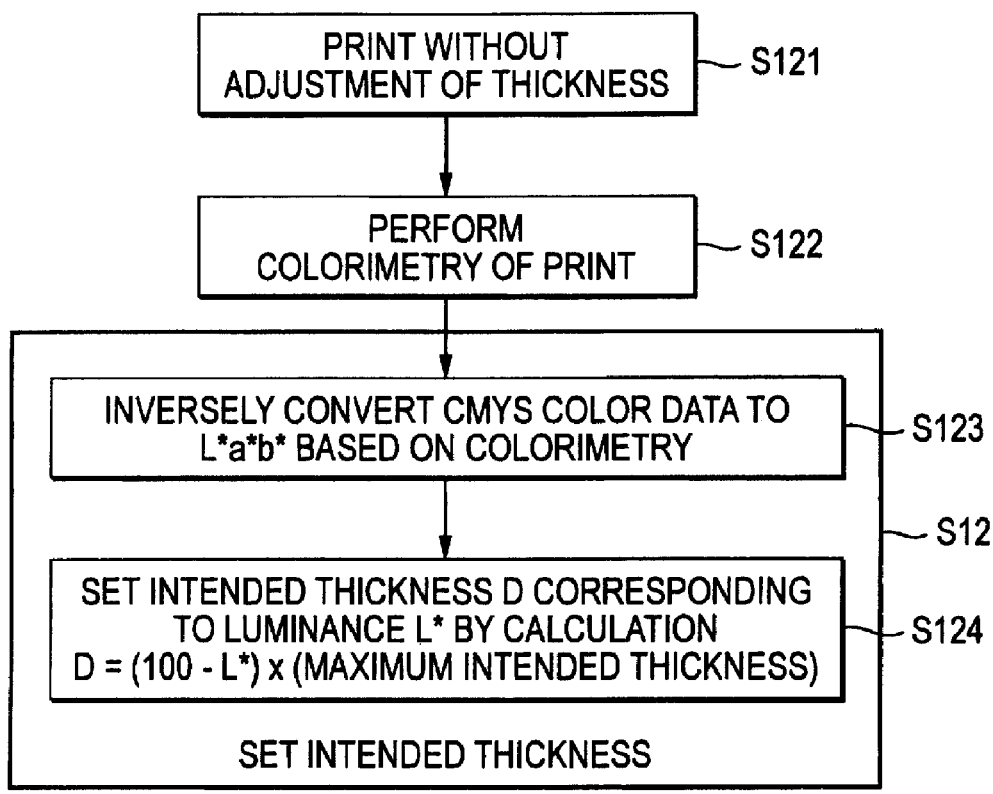
FIG. 6 is a chart diagram for illustrating operation of mainly an intended thickness-setting portion shown in FIG. 3.

FIG. 3 is a view showing the partial constitution of one embodiment of the intended thickness-setting unit, and FIG. 6 is a partial chart diagram mainly illustrating operation of the intended thickness-setting unit of the constitution shown in FIG. 3.

As a processing prerequisite for the intended thickness-setting step shown in step S12, image formation of plural standard color patches each having a color corresponding to a specific point of plural representative points among plural lattice points in the CMYS color space is performed in the step 121 without adjustment of the thickness of the image-forming material when CMYS color space data of an image are inputted, by means of the inkjet image-forming apparatus 10 using an active energy ray-curable ink. The output of this color patch is based on the patch data showing the color of each color patch in terms of the coordinate value (halftone dot % value of each color of CMYS) of each representative point in the CMYS color space.

Next, in step S122, the image of color patch formed without adjusting the thickness is subjected to colorimetry by means of a calorimetric sensor to obtain the calorimetric value of each color patch (L*a*b* space data).

In step S123, as a step of setting the intended thickness, definition of CMYS-L*a*b* color conversion is completed by receiving data from the calorimetric sensor by the inverse conversion unit shown in FIG. 3, calculating L*a*b* space data corresponding to lattice points other than the above-described representative point in the CMYS color space through interpolation processing using the calorimetric value, and finally preparing a table which associates CMYS color values of all the lattice points with the L*a*b* values.

In step S123, the thickness D is specified according to the following operation (a) for each pixel utilizing the L* value corresponding to luminance in the definition of CMYS-L*a*b* color conversion in the intended thickness-calculating unit 157.

$$D = (100 - L^*) \times (\text{maximum intended thickness}) \quad (a)$$

Here, the maximum intended thickness is the maximum value of L*.

The intended thickness specified in this step S123 is used in the aforesaid step 14.

By deciding the intended thickness as described above, the thickness of the image-forming material increases as the luminance value increases, and hence a operation formula can previously be set, which enables one to specify an ejection amount for a special color plate to a certain degree.

In the unit 158 for determining an application amount for each color in the step S14, it is explained that the existing thickness is made approximately the same as the intended thickness. Actually, however, it can sufficiently be imagined that adjustment of the existing thickness fails to reach the intended thickness. Thus, the existing thickness can be brought as close as possible to the intended thickness by the following embodiment.

One example of determining the application amount for each color will be illustrated below by using FIGS. 4 and 7.

Figure 4:
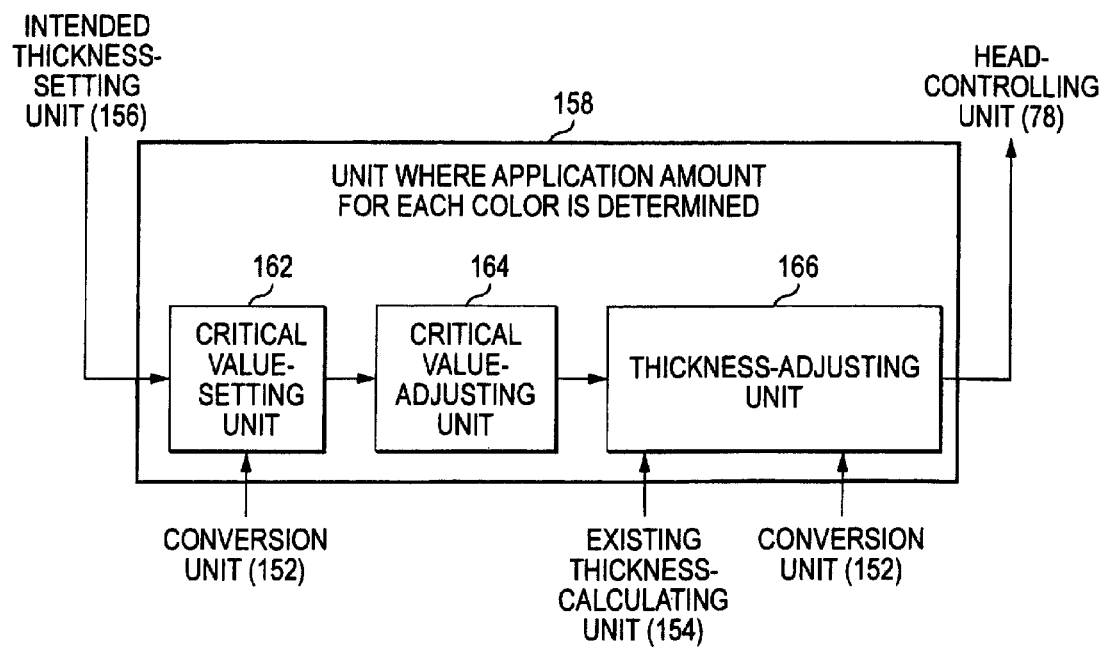
FIG. 4 is a view showing a portion where an application amount for each color is determined.
Figure 7:
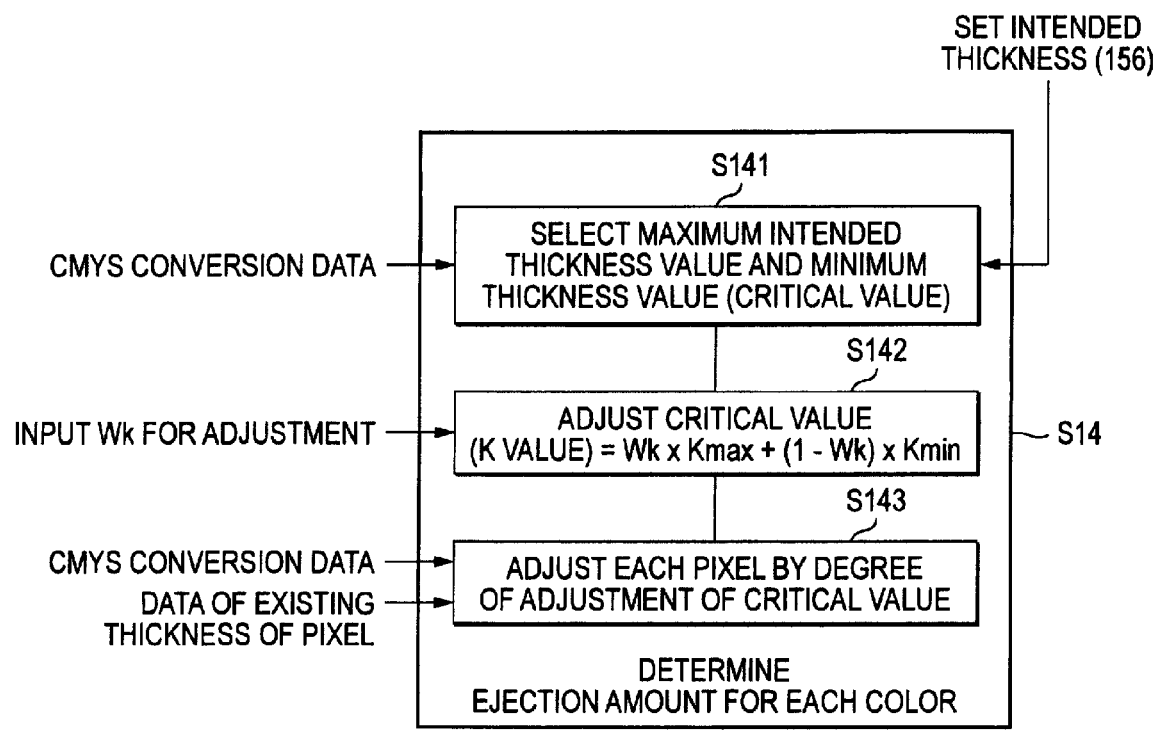
FIG. 7 is a chart diagram for illustrating operation of mainly a portion shown in FIG. 4 where an application amount for each color is determined.

FIG. 4 is a view showing a partial constitution of one embodiment of the unit for determining an application amount for each color, and FIG. 7 is a partial chart diagram for mainly illustrating the unit for determining an application amount for each color which is shown in FIG. 4.

In step S141, the minimum intended thickness value of a pixel having the minimum thickness and the maximum intended thickness value of a pixel having the maximum thickness are selected from the intended thickness values determined for respective pixels in the intended thickness-setting unit 156, and color space components of corresponding pixels are also selected from the CMYS color space data.

In step S142, the existing thickness only at both the pixel of the minimum thickness and the pixel of the maximum thickness is brought as close as possible to the intended thickness to thereby adjust the balance between the special color plate and the CMY plates. In particular, when the thickness of the special color plate is increased, the total thickness is reduced whereas, when the thickness of the special color plate is decreased, the total thickness is increased. Specific processing thereof is performed in the following manner.

First, as is the same in the step S123, corresponding L*a*b* space data are calculated with respect to the lattice points other than the above-described representative points in the CMYS color space by the interpolation processing using the calorimetric values, and finally preparing a table which associates CMYS color values of all the lattice points with the L*a*b* values to thereby complete definition of CMYS-L*a*b* color conversion.

A K value in the CMYS color space is determined with respect to each lattice point in the L*a*b* color space utilizing the table. Here, in this embodiment, in view of balancing the special color plate with the CMY plates, a K (black) value which is important for imparting change in thickness with reducing change in color is determined among special colors to thereby set the special color plate, followed by harmonizing the CMY plates therewith.

The manner of determining the K value will be described below.

In the critical value-adjusting portion 164, one of the plural lattice points in the Lab color space is determined to be starting coordinates P according to a specific order of priority. Then, with respect to the K value, a region of component which can be mapped to the starting coordinates by color conversion according to the definition of CMYS-L*a*b* color conversion is calculated.

Figure 8A:
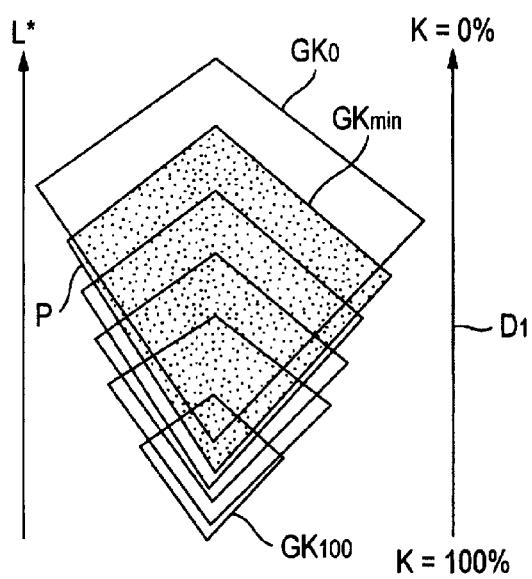
FIGS. 8A and 8B are diagram showings a manner of calculating a component range of K value which can be mapped to certain starting coordinates P.
Figure 8B:
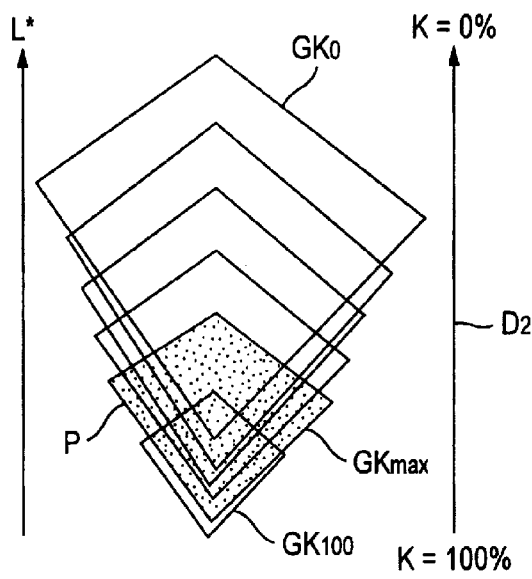

FIGS. 8A and 8B are view showing the manner of calculating the region of component of the K value capable of being mapped to certain starting coordinates P.

FIG. 8A shows the manner of calculating the lower limit of the K value in the component range (lower limit value of K, Kmin), and FIG. 8B shows the manner of calculating the upper limit of the K value in the component range (upper limit value of K, Kmax).

Calculation of the lower limit value of K, Kmin, will be described below. In this calculation, first, a color range (gamut), GK0, capable of being outputted in the inkjet image-forming apparatus 10 using an active energy ray-curable ink is calculated in the L*a*b* color space in the following manner, with the K value being fixed at 0%. That is, in a state where the K value is fixed at 0%, each of the C value, the M value, the Y value, the Or value, the V value, and the W value is changed from 0% to 100% with a specific interval, and coordinates on the L*a*b* color space corresponding to the resulting plural coordinates in a 1:1 manner are calculated based on the definition of CMYS-L*a*b* color conversion. Of the thus-calculated coordinates, a region surrounded by the coordinates positioning at the outermost edge in the L*a*b* color space is determined as gamut GK0 corresponding to the matter that K value=0%. In FIG. 8A, this gamut GK0 is shown as a cross-section obtained by cutting the gamut GK0 by a plane parallel to the L* axis. In this FIG. 8A, the L* axis is also shown but, in order to facilitate viewing of the drawing, gamut GK0 originally positioning over the L* axis is shown on the right side of the L* axis.

After determining gamut GK0 corresponding to the matter that the K value=0%, it is judged whether the starting coordinates P are contained within the gamut GK0 or not. In the case where the starting coordinates P are included within the gamut GK0, the value of 0% is determined to be the lower limit of K, Kmin. On the other hand, in the case where the starting coordinates P are not contained within the gamut GK0, the K value is increased by a specific amount and, with respect to the increased K value, calculation of the above-described gamut and judgment on the starting coordinates are performed. As the K value is increased in this manner, the gamut changes so that it descends from the gamut GK0 where K value=0% to the gamut GK100 where K value=100% along the L* axis as shown in FIG. 8A and that the area thereof is reduced. Such calculation of gamut and judgment processing are performed while increasing the K value from 0% to 100% as the arrow D1 in the drawing shows. Changing of the K value is stopped at a point where the starting coordinates P are included within the gamut as with the gamut GKmin hatched in the drawing, and the K value at the point is determined to be the lower limit of K value, Kmin.

Next, calculation of the upper limit of K, Kmax, will be described below. In this calculation, the calculation of gamut and judgment processing as described above are performed with decreasing the K value from 100% to 0% as the arrow D2 in the drawing shows. As the K value is decreased in this manner, the gamut changes so that it ascends from the gamut GK100 where K value=100% to the gamut GK0 where K value=0% along the L* axis as shown in FIG. 8B and that the area thereof extends. Changing of the K value is stopped at a point where the starting coordinates P are included within the gamut as with the gamut GKmax hatched in the drawing, and the K value at the point is determined to be the upper limit of K value, Kmax.

After the component region of K value which can be mapped to the starting coordinates P is determined as described above, the component-determining unit 340 shown in FIG. 6 determines the K value corresponding to the starting coordinates P to be a coordinate component within the component region according to the following formula (b):

$$K\text{value} = Wk \times K\text{max} + (1 - Wk) \times K\text{min} \quad (b)$$

wherein Kmax represents the upper limit value of K, and Kmin represents the lower limit value of K.

Further, Wk is a coefficient (weighting) which shows how much the K value is deviated to the Kmax side between the Kmax and the Kmin.

In this embodiment, this weighting Wk is previously prepared by a user and is stored within a memory not shown. This weighting Wk is read out from the memory not shown.

Therefore, in order to bring the thickness to the minimum thickness at the point where the thickness of the image-forming material becomes minimum, the following adjustment is to be performed.

(c) In the case where the minimum existing thickness<the minimum intended thickness: Since the existing thickness must be increased, adjustment of reducing the value of Wk is performed in order to reduce a special color plate and increase CMY plates of the CMYS.

(d) In the case where the minimum existing thickness>the minimum intended thickness: the adjustment is performed in the order reverse to that in (c).

Also, in order to bring the thickness to the maximum thickness at the point where the thickness of the image-forming material becomes maximum, the following adjustment is to be performed.

(e) In the case where the maximum existing thickness<the maximum intended thickness: Since the existing thickness must be increased, adjustment of reducing the value of Wk is performed in order to reduce a special color plate and increase CMY plates of the CMYS.

(f) In the case where the maximum existing thickness>the maximum intended thickness: the adjustment is performed in the order reverse to that in (e).

In the step S144, when the K value is set by a particular Wk in the step S144, the adjusting ratio for the entire image is set by the thickness-adjusting portion 166.

The adjusting ratio is set according to the following formula (c):

$$Y = (x-a) \times (b'-a')/(b-a) + a' \quad (c)$$

wherein Y represents a modified intended thickness, X represents an initial intended thickness for each pixel, a represents a thickness at the point where the initial thickness is minimum, b represents a thickness at the point where the initial thickness is maximum, a' represents a modified thickness at the point where the initial thickness is minimum, and b' represents a modified thickness at the point where the initial thickness is maximum.

As is described above, in the thickness-adjusting portion 166, the thus-specified adjusting ratio is applied to the CMYS color space data to perform adjustment for each pixel based on the state of the maximum thickness and the state of the minimum thickness, thus ejection in the head-controlling unit 78 being controlled.

Additionally, in this embodiment, as the inkjet image-forming apparatus 10 of the type using an active energy ray-curable ink, an apparatus having the constitution wherein an image is formed on a web-like recording medium by fixed heads is employed. Beside this, however, a sheet-like recording medium may be used, and there may be employed a moving-head-model image-forming apparatus.

Further, the image-forming method of the invention can be applied to any recording method that uses an image-forming material which does not completely permeate into a recording medium and which forms an image with a certain thickness, such as a method of forming electrophotographic prints using a toner, a common inkjet print-forming method, and a common printing method.

Here, the term "active energy radiation rays" as used herein in this specification means any radiation rays with no particular limitation that can impart, when an ink is irradiated therewith, a sufficient energy to generate an initiation species in the ink composition and include a wide variety of rays such as α-rays, γ-rays, X-rays, ultraviolet rays, visible light rays, and electron beams. Among them, ultraviolet rays and electron beams are preferred in view of curing sensitivity and availability of an apparatus, with ultraviolet rays being particularly preferred. Accordingly, as the ink composition of the invention, an ink composition curable by irradiation with ultraviolet rays is preferred.

In the inkjet image-forming apparatus, the peak wavelength of the active energy radiation rays is, for example, appropriately from 200 to 600 nm, preferably from 300 to 450 nm, more preferably from 350 to 450 nm, though depending upon absorption characteristics of a sensitizing dye in the ink composition. In the invention, the electron transfer initiation system (a) of the ink composition exhibits a sufficient sensitivity even in the case of a low output of active energy rays. Therefore, the output of active energy rays has irradiation energy of, for example, from 2,000 mJ/cm$^2$ or less, preferably from 10 to 2,000 mJ/cm$^2$, more preferably from 20 to 1,000 mJ/cm$^2$, still more preferably from 50 to 800 mJ/cm$^2$. The irradiation of the active energy rays is performed at the exposure surface illuminance (the maximum illuminance of the surface of the recording medium) is, for example, from 10 to 2,000 mW/cm$^2$, preferably from 20 to 1,000 mW/cm$^2$.

Particularly, in the inkjet image-forming apparatus, it is preferred that the irradiation of the active energy rays is performed by a light emitting diode generating ultraviolet rays in which the peak emission wavelength is from 390 to 420 nm, and the maximum illuminance at the surface of the recording medium is from 10 to 1,000 mW/cm$^2$.

Also, in the inkjet image-forming apparatus of the invention, the ink composition ejected onto the recording medium is irradiated with active energy rays for, for example, from 0.01 to 120 sec., preferably from 0.1 to 90 sec.

Further, in the inkjet image-forming apparatus of the invention, it is preferred that the ink composition is heated to a constant temperature, and that the time period from the impact of the ink composition onto the recording medium to the irradiation with active energy rays is from 0.01 to 0.5 sec. The time period is preferably from 0.02 to 0.3 sec., more preferably from 0.03 to 0.15 sec. When the time period from the impact of the ink composition onto the recording medium to the irradiation of active energy rays is controlled so as to be very short in this way, it becomes possible to prevent the impacted ink composition from blurring before the ink composition cures.

Additionally, when a color image is to be obtained by using the inkjet image-forming apparatus of the invention, preferably, colors are sequentially stacked in ascending order of luminosity. When colors are stacked in this manner, the active energy rays easily reach even a lower ink, and an excellent curing sensitivity, reduction of residual monomers, reduction of odor, and improvement of adherence can be expected. Also, in irradiation of active energy rays, it is possible to emit all colors to collectively perform the exposure. From the viewpoint of promotion of curing, however, it is preferred to perform the exposure, color by color.

Also, as described above, in an active energy ray-curable ink such as the ink composition, the ejected ink composition is preferably set to a constant temperature. Hence, in a range from an ink supply tank to an inkjet head portion, it is preferable to perform a temperature control by heat insulation and heating. Further, in order to prevent the main unit of the apparatus from being affected by the temperature of the atmosphere, preferably, a head unit in which heating is performed is thermally isolated or heat-insulated. In order to shorten the start-up time of a printer required for heating, or reduce the loss of heat energy, preferably, the heating unit is heat-insulated from the other units, and the thermal capacity of the whole heating unit is reduced.

As the source of active energy rays, a mercury lamp, a gas/solid state laser, or the like is mainly used. In an ultraviolet curable inkjet image-forming apparatus, a mercury lamp or a metal halide lamp is widely used. The replacement to a GaN semiconductor ultraviolet light emitting device is very effective from industrial and environmental viewpoints. Further, an LED (UV-LED) and an LD (UV-LD) have features of a small size, a long life period, a high efficiency, and a low cost, and hence are expected as a radiation source for an inkjet image-forming apparatus using an active energy ray-curable ink.

Also, as described above, a light emitting diode (LED) or a laser diode (LD) can be used as the source of active energy rays. Particularly, in the case where an ultraviolet ray source is required, an ultraviolet LED or an ultraviolet LD can be used. For example, Nichia Corporation has marketed a violet LED in which the main emission spectrum is a wavelength between 365 nm and 420 nm. Further, in the case where a shorter wavelength is necessary, U.S. Pat. No. 6,084,250 discloses an LED which can emit active energy rays centered between 300 nm and 370 nm. Other ultraviolet LEDs are also available, and radiation of a different ultraviolet ray band is possible. A particularly preferred active energy source is a UV-LED, and a particularly preferred source is a UV-LED having a peak wavelength at 350 to 420 nm.

<Recording Medium>

The recording medium to which an ink composition of the invention is applicable is not particularly limited, and usable examples thereof include papers such as usual non-coated papers and coated papers and various non-absorbing resin materials which are used for so-called flexible packaging or resin films resulting from molding such a resin material into a film. Examples of various plastic films which can be used include PET films, OPS films, OPP films, ONy films, PVC films, PE films, and TAC films. Besides, examples of plastics which can be used as the recording medium include polycarbonates, acrylic resins, ABS, polyacetals, PVA, and rubbers. Metals and glasses can also be used as the recording medium.

With an ink composition of the invention, in the case where a material which undergoes less heat shrinkage upon curing is selected, it shows an excellent adhesion between the cured ink composition and the recording medium. Thus, such selection provides an advantage that a high-definition image can be formed even by using a film which is liable to cause curling or deformation due to curing and shrinkage of the ink or the heat generation at the time of curing reaction, such as PET films, OPS films, OPP films, ONy films, and PVC films.

The respective constitutional components to be used in the ink composition which can be used in the invention will be hereunder described in order hereinafter.

<Ink Composition>

An ink composition to be used in the invention is an ink composition which is curable by irradiation with active energy rays, and examples thereof include a cationic polymerization based ink composition, a radical polymerization based ink composition, and an aqueous ink composition. These compositions will be described in detail hereinafter.

<Cationic Polymerization Ink Composition>

The cationic polymerization ink composition contains (a) a cationic polymerizable compound and (b) a compound from which an acid is produced by irradiation of active energy rays. As desired, the composition may contain an ultraviolet ray absorbent, a sensitizer, an antioxidant, a discoloration preventing agent, an electrically conductive salt, a solvent, a high-molecular compound, a surfactant, etc.

Hereinafter, components used in the cationic polymerization ink composition will be sequentially described.

<(a) Cationic Polymerizable Compound>

A cationic polymerizable compound (a) to be used in the invention is not particularly restricted, and any compound may be used that causes a polymerization reaction with an acid originated from the compound (b) from which the acid is produced by irradiation of active energy rays and is cured with the acid. Various known cationic polymerizable monomers which are known as light cationic polymerizable monomers may be used. Examples of the cationic polymerizable monomer include epoxy compounds, vinyl ether compounds, oxetane compounds, and the like disclosed in various publications such as JP-A-6-9714, JP-A-2001-31892, JP-A-2001-40068, JP-A-2001-55507, JP-A-2001-310938, JP-A-2001-310937, and JP-A-2001-220526.

Examples of the epoxy compounds include aromatic epoxides, alicyclic epoxides, and aliphatic epoxides.

As the aromatic epoxides, there are illustrated di- or polyglycidyl ethers produced by the reaction between a polyhydric phenol having at least one aromatic nucleus or an alkylene oxide adduct thereof and epichlorohydrin. Examples thereof include di- or polyglycidyl ethers of bisphenol A or an alkylene oxide adduct thereof, di- or polyglycidyl ethers of hydrogenated bisphenol A or an alkylene oxide adduct thereof, and novolak type epoxy resins. Here, examples of the alkylene oxide include ethylene oxide and propylene oxide.

As the alicyclic epoxide, there are preferably illustrated cyclohexene oxide-containing or cyclopentene oxide-containing compounds which are obtained by epoxidizing a compound having at least one cycloalkene ring such as a cyclohexene ring or a cyclopentene ring with a suitable oxidizing agent such as hydrogen peroxide and a peracid.

As the aliphatic epoxide, there are illustrated di- or polyglycidyl ethers of an aliphatic polyhydric alcohol or an alkylene oxide adduct thereof. Representative examples thereof include diglycidyl ethers of an alkylene glycol such as diglycidyl ether of ethylene glycol, diglycidyl ether of propylene glycol, and diglycidyl ether of 1,6-hexanediol; polyglycidyl ethers of a polyhydric alcohol such as di- or triglycidyl ethers of glycerin or an alkylene oxide adduct thereof; and diglycidyl ethers of a polyalkylene glycol represented by diglycidyl ethers of polyethylene glycol or an alkylene oxide adduct thereof and diglycidyl ethers of polypropylene glycol or an alkylene oxide adduct thereof. Here, examples of the alkylene oxide include ethylene oxide and propylene oxide.

The epoxy compound may be monofunctional or polyfunctional.

Examples of the monofunctional epoxy compound which can be used in the invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadienemonoxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, and 3-vinylcyclohexene oxide.

Also, examples of the polyfunctional epoxy compound include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resins, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexane carboxylate, 2-(3,4-epoxy-cyclohexyl-5,5-spiro-3,4-epoxy)cyclohexane-m-dioxane, bis-(3,4-epoxycyclohexylmethyl)adipate, vinylcyclohexene oxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexane carboxylate, methylenebis(3,4-epoxycyclohexane), dicyclopentadiene diepoxide, di(3,4-epoxycyclohexylmethyl) ether of ethylene glycol, ethylenebis(3,4-epoxycyclohexane carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxyoctane, and 1,2,5,6-diepoxycyclooctane.

Of these epoxy compounds, aromatic epoxides and alicyclic epoxides are preferred, and alicyclic epoxides are especially preferred, from the viewpoint of excellent curing rate.

Examples of the vinyl ether compound include di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-O-propylene carbonate, dodecyl vinyl ether, diethylene glycol monovinyl ether, and octadecyl vinyl ether.

The vinyl ether compound may be monofunctional or polyfunctional.

Specifically, examples of the monofunctional vinyl ether include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Further, examples of the polyfunctional vinyl ether include divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ethers, and bisphenol F alkylene oxide divinyl ethers; and polyfunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide-added trimethylolpropane trivinyl ether, propylene oxide-added trimethylolpropane trivinyl ether, ethylene oxide-added ditrimethylolpropane tetravinyl ether, propylene oxide-added ditrimethylolpropane tetravinyl ether, ethylene oxide-added pentaerythritol tetravinyl ether, propylene oxide-added pentaerythritol tetravinyl ether, ethylene oxide-added dipentaerythritol hexavinyl ether, and propylene oxide-added dipentaerythritol hexavinyl ether.

As the vinyl ether compound, from the viewpoints of curing properties, adhesion to the recording medium and surface hardness of the formed image, di- or trivinyl ether compounds are preferred; and divinyl ether compounds are particularly preferred.

The oxetane compound as referred to in the specification means a compound having an oxetane ring and can be arbitrarily selected and used among known oxetane compounds as described in JP-A-2001-220526, JP-A-2001-310937, and JP-A-2003-341217.

As the compound having an oxetane ring which can be used in an ink composition of the invention, compounds having from one to four oxetane rings in the structure thereof are preferred. Use of such a compound facilitates to keep the viscosity of the ink composition within the range suitable for handling properties. Further, it is possible to obtain high adhesion between the ink composition and the recording medium after curing.

Such a compound having an oxetane ring is described in detail in paragraphs [0021] to [0084] of JP-A-2003-341217, and compounds described in this patent document can also be suitably used in the invention.

Of the oxetane compounds to be used in the invention, a compound having one oxetane ring is preferably used from the viewpoints of viscosity and adhesiveness of the ink composition.

In an ink composition of the invention, these cationic polymerizable compounds may be used singly or in combination of two or more thereof However, from the viewpoint of effectively suppressing shrinkage upon curing of the ink, it is preferred to use a combination of at least one compound selected from oxetane compounds and epoxy compounds with a vinyl ether compound.

The content of the cationic polymerizable compound (a) in the ink composition is suitably in the range of from 10 to 95% by weight, preferably from 30 to 90% by weight, more preferably from 50 to 85% by weight with respect to the weight of all solids of the composition.

<(b) Compound Capable of Generating an Acid by Irradiation with Active Energy Rays>

An ink composition of the invention contains a compound capable of generating an acid by irradiation with active energy rays (hereinafter properly referred to as "photo acid generating agent").

As the photo acid generating agent which can be used in the invention, compounds capable of generating an acid by irradiation of rays (for example, ultraviolet rays and far ultraviolet rays having a wavelength of from 400 to 200 nm; especially preferably g-rays, h-rays, i-rays, and KrF excimer laser light), ArF excimer laser light, electron beams, X-rays, molecular rays, or ion beams, which are used in photo cationic polymerization photoinitiators, photo radical polymerization photoinitiators, photo decolorizing agents of dyes, photo discoloring agents, or micro resists, can be properly selected to use.

Examples of such a photo acid generating agent include compounds which are decomposed by irradiation with active energy rays to generate an acid, such as onium salts (for example, diazonium salts, ammonium salts, phosphonium salts, iodonium salts, sulfonium salts, selenonium salts, and arsonium salts), organic halogen compounds, organic metals or organic halides, photo acid generating agents having an o-nitrobenzyl type protective group, compounds which are photo decomposed to generate sulfonic acid, represented by imino sulfonate, disulfone compounds, diazo keto sulfone, and diazo disulfone compounds.

Also, oxazole derivatives and s-triazine derivatives described in paragraphs [0029] to [0030] of JP-A-2002-122994 can be suitably used as the photo acid generating agents. In addition, onium salt compounds and sulfonate based compounds illustrated in paragraphs [0037] to [0063] of JP-A-2002-122994 can be suitably used as the photo acid generating agents in the invention.

The photo acid generating agents (b) can be used singly or in combination of two or more thereof.

The content of the photo acid generating agent (b) in the ink composition is preferably from 0.1 to 20% by weight, more preferably from 0.5 to 10% by weight, still more preferably from 1 to 7% by weight based on the weight of the all solids of the ink composition.

<Coloring Agent>

In an ink composition of the invention, by adding a coloring agent, it is possible to form a visible image. For example, in the case of forming an image area of a lithographic printing plate, though it is not always required to add a coloring agent, it is preferred to use a coloring agent from the viewpoint of plate inspection properties of the resulting lithographic printing plate.

The coloring agent which can be used herein is not particularly limited but can be properly selected from among various known coloring materials (for example, pigments and dyes) to use depending upon the utilization. For example, in the case of forming an image having excellent weather resistance, a pigment is preferred. As the dye, though any of water-soluble dyes and oil-soluble dyes can be used, oil-soluble dyes are preferred.

<Pigment>

The pigment preferably used in the invention will be described hereinafter.

The pigment is not particularly limited, and all organic pigments and inorganic pigments which are generally commercially available, substances resulting from dispersing a pigment in, as a dispersion medium, an insoluble resin, etc., and substances resulting from grafting a resin on the surface of a pigment can be used. Substances resulting from dyeing a resin particle with a dye can also be used.

Examples of such a pigment include pigments as described in *Ganryo No Jiten* (Pigment Dictionary), edited by Seishiro ITO (published in 2000), W. Herbst and K. Hunger, Industrial Organic Pigments, JP-A-2002-12607, JP-A-2002-188025, JP-A-2003-26978, and JP-A-2003-342503.

Specific examples of the organic pigment and the inorganic pigment which can be used in the invention are as follows. That is, examples of pigments which exhibit a yellow color include monoazo pigments such as C.I. Pigment Yellow 1 (for example, Fast Yellow G) and C.I. Pigment Yellow 74; disazo pigments such as C.I. Pigment Yellow 12 (for example, Disazo Yellow AAA) and C.I. Pigment Yellow 17; non-benzidine based azo pigments such as C.I. Pigment Yellow 180; azo lake pigments such as C.I. Pigment Yellow 100 (for example, Tartrazine Yellow Lake); condensed azo pigments such as C.I. Pigment Yellow 95 (for example, Condensed Azo Yellow GR); acid dye lake pigments such as C.I. Pigment Yellow 115 (for example, Quinoline Yellow Lake); basic dye lake pigments such as C.I. Pigment Yellow 18 (for example, Thioflavine Lake); anthraquinone based pigments such as Flavanthrone Yellow (Y-24); isoindolinone pigments such as Isoindolinone Yellow 3RLT (Y-110); quinophthalone pigments such as Quinophthalone Yellow (Y-138); isoindoline pigments such as Isoindoline Yellow (Y-139); nitrosopigments such as C.I. Pigment Yellow 153 (for example, Nickel Nitroso Yellow); and metal complex salt azomethine pigments such as C.I. Pigment Yellow 117 (for example, Copper Azomethine Yellow).

Examples of pigments which exhibit a red or magenta color include monoazo based pigments such as C.I. Pigment Red 3 (for example, Toluidine Red); disazo pigments such as C.I. Pigment Red 38 (for example, Pyrazolone Red B); azo lake pigments such as C.I. Pigment Red 53:1 (for example, Lake Red C) and C.I. Pigment Red 57:1 (for example, Brilliant Carmine 6 B); condensed azo pigments such as C.I. Pigment Red 144 (for example, Condensed Azo Lake BR); acid dye lake pigments such as C.I. Pigment Red 174 (for example, Phloxine B Lake); basic dye lake pigments such as C.I. Pigment Red 81 (for example, Rhodamine 6G' Lake); anthraquinone based pigments such as C.I. Pigment Red 177 (for example Dianthraquinonyl Red); thioindigo pigments such as C.I. Pigment Red 88 (for example, Thioindigo Bordeaux); perinone pigments such as C.I. Pigment Red 194 (for example, Perinone Red); perylene pigments such as C.I. Pigment Red 149 (for example, Perylene Scarlet); quinacridone pigments such as C.I. Pigment Violet 19 (for example, unsubstituted quinacridone) and C.I. Pigment Red 122 (for example, Quinacridone Magenta); isoindolinone pigments such as C.I. Pigment Red 180 (for example, Isoindolinone Red 2BLT); and alizarine lake pigments such as C.I. Pigment Red 83 (for example, Madder Lake).

Examples of pigments which exhibit a blue or cyan color include disazo based pigments such as C.I. Pigment Blue 25 (for example, Dianisidine Blue); phthalocyanine pigments such as C.I. Pigment Blue 15 (for example, Phthalocyanine Blue); acid dye lake pigments such as C.I. Pigment Blue 24 (for example, Peacock Blue Lake); basic dye lake pigments such as C.I. Pigment Blue 1 (for example, Victoria Pure Blue BO Lake); anthraquinone based pigments such as C.I. Pigment Blue 60 (for example, Indanthrone Blue); and alkali blue pigments such as C.I. Pigment Blue 18 (for example, Alkali Blue V-5:1).

Examples of pigments which exhibit a green color include phthalocyanine pigments such as C.I. Pigment Green 7 (Phthalocyanine Green) and C.I. Pigment Green 36 (Phthalocyanine Green); and azo metal complex pigments such as C.I. Pigment Green 8 (Nitroso Green).

Examples of pigments which exhibit an orange color include isoindoline based pigments such as C.I. Pigment Orange 66 (Isoindoline Orange); and anthraquinone based pigments such as C.I. Pigment Orange 51 (Dichloropyranthrone Orange).

Examples of pigments which exhibit a black color include carbon black, titanium black, and aniline black.

Specific examples of white pigments which can be utilized include basic lead carbonate ($2PbCO_3Pb(OH)_2$, so-called "silver white"), zinc oxide (ZnO, so-called "zinc white"), titanium oxide ($TiO_2$, so-called "titanium white"), strontium titanate ($SrTiO_3$, so-called "titanium strontium white").

Here, titanium oxide has a low specific gravity and a high refractive index and is chemically and physically stable as compared with other white pigments. Thus, the titanium oxide has large covering power and coloring power as a pigment and, further, has excellent durability against acids, alkalis and other environments. Accordingly, it is preferred to use titanium oxide as the white pigment. As a matter of course, other white pigments (other white pigments than those as illustrated previously may also be used) may be used as the need arises.

For dispersing the pigment, dispersing units such as a ball mill, a sandmill, an attritor, a roll mill, a jet mill, a homogenizer, a paint shaker, a kneader, an agitator, a Henschel mixer, a colloid mill, an ultrasonic homogenizer, a pearl mill, and a wet jet mill can be employed.

In dispersing the pigment, it is also possible to add a dispersant. Examples of the dispersant include hydroxyl group-containing carboxylic acid esters, salts between a long chain polyaminoamide and a high molecular acid ester, salts of a high molecular polycarboxylic acid, high molecular unsaturated acid esters, high molecular copolymers, modified polyacrylates, aliphatic polyhydric carboxylic acids, naphthalenesulfonic acid formalin condensates, polyoxyethylene alkylphosphoric esters, and pigment derivatives. It is also preferred to use a commercially available high molecular dispersant such as Zeneca's SOLSPERSE Series.

Further, it is possible to use, as a dispersing aid, a synergist adaptive to a pigment of every kind. Such a dispersant or dispersing aid is added in an amount of preferably from 1 to 50 parts by weight per 100 parts by weight of the pigment.

In an ink composition, a solvent may be added as a dispersion medium for various components inclusive of the pigment. Also, the foregoing cationic polymerizable compound (a) which is a low molecular component may be used as the dispersion medium in the absence of a solvent. However, since an ink composition of the invention is an active energy ray-curable ink and, after applying on the recording medium, the ink is cured, it is preferred that the ink composition is free from a solvent. This is because when the solvent remains in the cured ink image, the solvent resistance is deteriorated or the residual solvent causes a problem of VOC (volatile organic compound). In view of this point, the cationic polymerizable compound (a) is used as the dispersion medium. Especially, a cationic polymerizable monomer having the lowest viscosity is preferably selected from the viewpoints of dispersing adaptability and improvement of handling properties of the ink composition.

An average particle size of the pigment is preferably in the range of from 0.02 to 4 μm, more preferably from 0.02 to 2 μm, still more preferably from 0.02 to 1.0 μm.

The pigment, the dispersant and the dispersion medium are selected and the dispersing condition and the filtration condition are set up so as to make the average particle size of the pigment particles fall within the foregoing preferred range. By managing the particle size as described above, it becomes possible to suppress clogging of a head nozzle and to keep the storage stability of the ink and the transparency and curing sensitivity of the ink.

<Dye>

As the dye to be used in the invention, an oil-soluble dye is preferred. Specifically, the oil-soluble dye means a dye having a solubility in water at 25° C. (weight of the dye dissolved in 100 g of water) of not more than 1 g, preferably not more than 0.5 g, more preferably not more than 0.1 g. Accordingly, a so-called water-insoluble and oil-soluble dye is preferably used.

With the dye to be used in the invention, it is also preferred to introduce an oil-solubilizing group into the mother nucleus of the foregoing dye for the purpose of dissolving a necessary amount of the dye in the ink composition.

Examples of the oil-solubilizing group include a long chain or branched alkyl group, a long chain or branched alkoxy group, a long chain or branched alkylthio group, a long chain or branched alkylsulfonyl group, a long chain or branched acyloxy group, a long chain or branched alkoxycarbonyl group, a long chain or branched acyl group, a long chain or branched acylamino group, a long chain or branched alkylsulfonylamino group, and a long chain or branched alkylaminosulfonyl group; and an aryl group, an aryloxy group, an aryloxycarbonyl group, an arylcarbonyloxy group, an arylaminocarbonyl group, an arylaminosulfonyl group, and an arylsulfonylamino group each containing the foregoing long chain or branched substituent.

Also, with respect to the water-soluble dye having a carboxylic acid or a sulfonic acid, a dye may be obtained by converting it into an oil-solubilizing group including an alkoxycarbonyl group, an aryloxycarbonyl group, an alkylaminosulfonyl group, or an arylaminosulfonyl group using a long chain or branched alcohol, amine, phenol or aniline derivative.

The oil-soluble dye is preferably an oil-soluble dye having a melting point of not higher than 200° C., more preferably an oil-soluble dye having a melting point of not higher than 150° C., and still more preferably an oil-soluble dye having a melting point of not higher than 100° C. By using an oil-soluble dye having a low melting point, deposition of crystals of the dye in the ink composition is suppressed, and the storage stability of the ink composition is improved.

Also, for the purpose of improving fading, especially resistance to oxidizers such as ozone and curing characteristics, it is preferable that the oxidation potential is noble (high). For that reason, an oil-soluble dye having an oxidation potential of 1.0 V (vs SCE) or more is preferably used as the oil-soluble dye to be used in the invention. A higher oxidation potential is more preferred. The oxidation potential is more preferably 1.1 V (vs SCE) or more, especially preferably 1.15 V (vs SCE) or more.

As a dye having a yellow color, compounds having a structure represented by the general formula (Y-I) described in JP-A-2004-250483 are preferred.

Dyes represented by the general formulae (Y-II) to (Y-IV) described in paragraph [0034] of JP-A-2004-250483 are particularly preferred. Specific examples thereof include compounds described in paragraphs [0060] to [0071] of JP-A-2004-250483. Additionally, the oil-soluble dyes of the general formula (Y-I) described in the subject patent document may be used for inks of any colors including not only yellow inks but also black inks and red inks.

As a dye having a magenta color, compounds having a structure represented by the general formulae (3) and (4) described in JP-A-2002-114930 are preferred. Specific examples thereof include compounds described in paragraphs [0054] to [0073] of JP-A-2002-114930.

Azo dyes represented by the general formulae (M-1) to (M-2) described in paragraphs [0084] to [0122] of JP-A-2002-121414 are especially preferred. Specific examples thereof include compounds described in paragraphs [0123] to [0132] of JP-A-2002-121414. Additionally, the oil-soluble dyes of the general formulae (3), (4) and (M-1) to (M-2) described in the subject patent document may be used for inks of any colors including not only magenta inks but also black inks and red inks.

As a dye having a cyan color, dyes represented by the general formulae (I) to (IV) described in JP-A-2001-181547 and dyes represented by the general formulae (IV-1) to (IV-4) described in paragraphs [0063] to [0078] of JP-A-2002-121414 are preferred. Specific examples thereof include compounds described in paragraphs [0052] to [0066] of JP-A-2001-181547 and compounds described in paragraphs [0079] to [0081] of JP-A-2002-121414.

Phthalocyanine dyes represented by the general formulae (C-I) and (C-II) described in paragraphs [0133] to [0196] of JP-A-2002-121414 are especially preferred, with phthalocyanine dyes represented by the general formula (C-II) being further preferred. Specific examples thereof include compounds described in paragraphs [0198] to [0201] of JP-A-2002-121414. Additionally, the oil-soluble dyes of the foregoing general formulae (I) to (IV), (IV-1) to (IV-4), (C-I) and (C-II) may be used for inks of any colors including not only cyan inks but also black inks and green inks.

Such a coloring agent is preferably added in an amount of from 1 to 20% by weight, more preferably from 2 to 10% by weight with respect to the weight of the all solids in the ink composition.

In addition to the above-described necessary components, various additives can be added depending upon the purposes. Such optional components will be described hereinafter.

<Ultraviolet Ray Absorbent>

In the invention, an ultraviolet ray absorbent can be used from the viewpoints of improving the weather resistance and preventing the fading of the resulting image.

Examples of the ultraviolet ray absorbent include benzotriazole based compounds described in JP-A-58-185677, JP-A-61-190537, JP-A-2-782, JP-A-5-197075, and JP-A-9-34057; benzophenone based compounds described in JP-A-46-2784, JP-A-5-194483, and U.S. Pat. No. 3,214,463; cinnamic acid based compounds described in JP-B-48-303492, JP-B-56-21141, and JP-A-10-88106; triazine based compounds described in JP-A-4-298503, JP-A-8-53427, JP-A-8-239368, JP-A-10-182621, and JP-T-8-501291 (the term "JP-T" as used herein means a published Japanese translation of a PCT application); compounds as described in Research Disclosure, No. 24239; compounds capable of absorbing ultraviolet rays to emit fluorescence, as represented by stilbene based compounds and benzoxazole based compounds; and so-called fluorescent brighteners.

Though the amount of addition of the ultraviolet ray absorbent is properly selected depending upon the purpose, it is generally from about 0.5 to about 15% by weight in terms of solids.

<Sensitizer>

For the purposes of improving the acid generation efficiency of the photo acid generating agent and shifting the light-sensitive wavelength into a long wavelength side, a sensitizer may be added to the ink composition of the invention as needed. The sensitizer may be any sensitizer as long as it is able to sensitize the photo acid generating agent through an electron transfer mechanism or an energy transfer mechanism. Preferred examples thereof include aromatic polycondensed cyclic compounds such as anthracene, 9,10-dialkoxy-anthracenes, pyrene, and perylene; aromatic ketone compounds such as acetophenone, benzophenone, thioxanthone, and Michler's ketone; and heterocyclic compounds such as phenothiazine and N-aryloxazolidinones. Though the amount of addition of the sensitizer is properly selected depending upon the purpose, it is generally from 0.01 to 1% by mole, and preferably from 0.1 to 0.5% by mole with respect to the photo acid generating agent.

<Antioxidant>

For the purpose of improving the stability of the ink composition, an antioxidant can be added thereto. Examples of the antioxidant include those antioxidants which are described in EP-A-223739, EP-A-309401, EP-A-309402, EP-A-310551, EP-A-310552, EP-A-459416, DE-A-3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

Though the amount of addition of the antioxidant is properly selected depending upon the purpose, it is generally from about 0.1 to 8% by weight in terms of solids.

<Anti-Fading Agent>

In an ink composition of the invention, various organic or metal complex based anti-fading agents can be used. Examples of the organic anti-fading agent include hydroquinones, alkoxyphenols, dialkoxyphenols, phenols, anilines, amines, indanes, chromans, alkoxyanilines, and heterocyclic compounds. Examples of the metal complex based anti-fading agent include nickel complexes and zinc complexes. Specifically, compounds described in patents as cited in Research Disclosure, No. 17643, No. VII, Items I to J, ibid., No. 15162, ibid., No. 18716, page 650, left-hand column, ibid., No. 36544, page 527, ibid., No. 307105, page 872, and ibid., No. 15162; and compounds included in the general formulae of representative compounds and compound examples as described on pages 127 to 137 of JP-A-62-215272 can be used.

Though the amount of addition of the anti-fading agent is properly selected depending upon the purpose, it is generally from about 0.1 to 8% by weight in terms of solids.

<Electrically Conductive Salt>

For the purpose of controlling ejection physical properties, electrically conductive salts such as potassium thiocyanate, lithium nitrate, ammonium thiocyanate, and dimethylamine hydrochloride can be added to the ink composition of the invention.

<Solvent>

In the ink composition of the invention, for the purpose of improving adhesion to the recording medium, it is also effective to add an extremely trace amount of an organic solvent.

Examples of the solvent include ketone based solvents such as acetone, methyl ethyl ketone, and diethyl ketone; alcohol based solvents such as methanol, ethanol, 2-propanol, 1-propanol, 1-butanol, and tert-butanol; chlorine-containing solvents such as chloroform and methylene chloride; aromatic solvents such as benzene and toluene; ester based solvents such as ethyl acetate, butyl acetate, and isopropyl acetate; ether based solvents such as diethyl ether, tetrahydrofuran, and dioxane; and glycol ether based solvents such as ethylene glycol monomethyl ether and ethylene glycol dimethyl ether.

In this case, it is effective to add the solvent in an amount within the range where problems in solvent resistance and VOC are not caused. Its amount is preferably in the range of from 0.1 to 5% by weight, more preferably from 0.1 to 3% by weight with respect to the weight of the whole ink composition.

<High Molecular Compound>

For the purpose of adjusting film physical properties, various high molecular compounds can be added to an ink composition of the invention. Examples of the high molecular compound which can be used include acrylic polymers, polyvinyl butyral resins, polyurethane resins, polyamide resins, polyester resins, epoxy resins, phenol resins, polycarbonate resins, polyvinyl butyral resins, polyvinyl formal resins, shellac, vinyl based resins, acrylic resins, rubber based resins, waxes, and other natural resins. Such high molecular compounds may be used in combination of two or more thereof Of these, vinyl based copolymers obtainable from copolymerization of an acrylic monomer are preferred. In addition, with respect to the copolymerization composition of a high molecular binding material, copolymers containing, as a structural unit, a "carboxyl group-containing monomer", an "alkyl methacrylate" or an "alkyl acrylate" are also preferably used.

<Surfactant>

A surfactant may also be added to an ink composition of the invention.

As the surfactant, there are illustrated surfactants described in JP-A-62-173463 and JP-A-62-183457. Examples thereof include anionic surfactants such as dialkylsulfosuccinic acid salts, alkylnaphthalenesulfonic acid salts, and fatty acid salts; nonionic surfactants such as polyoxyethylene alkyl ethers, polyoxyethylene alkylaryl ethers, acetylene glycols, and polyoxyethylene-polyoxypropylene block copolymers; and cationic surfactants such as alkylamine salts and quaternary ammonium salts. Additionally, organic fluoro compounds may be used in place of the foregoing surfactants. The organic fluoro compound is preferably hydrophobic. Examples of the organic fluoro compound include fluorine-containing surfactants, oily fluorine-containing compounds (for example, fluorine oils), and solid fluorine compound resins (for example, tetrafluoroethylene resins). Also, there are illustrated organic fluoro compounds described in JP-B-57-9053 (columns 8 to 17) and JP-A-62-135826.

Besides, it is possible to contain, for example, a leveling additive, a matting agent, a wax for adjusting film physical properties, and a tackifier for improving adhesion to a recording medium such as polyolefins and PET, which does not hinder the polymerization, as the need arises.

Specifically, the tackifier includes high molecular adhesive polymers described on pages 5 to 6 of JP-A-2001-49200 (for example, copolymers made of an ester between (meth)acrylic acid and an alcohol containing an alkyl group having from 1 to 20 carbon atoms, an ester between (meth)acrylic acid and an alicyclic alcohol having from 3 to 14 carbon atoms, and an ester between (meth)acrylic acid and an aromatic alcohol having from 6 to 14 carbon atoms); and low molecular tackiness-imparting resins containing a polymerizable unsaturated bond.

<Radical Polymerization Based Ink Composition>

The radical polymerization based ink composition contains (d) a radical polymerizable compound and (e) a polymerization initiator. As desired, the composition may further contain a coloring agent, a sensitizing dye, a co-sensitizer, etc.

Hereinafter, components used in the radical polymerization based ink composition will be sequentially described.

<(d) Radical Polymerizable Compound>

The radical polymerizable compound includes, for example, a compound containing an addition polymerizable ethylenically unsaturated bond as enumerated below.

<Compound Containing an Addition Polymerizable Ethylenically Unsaturated Bond>

Examples of the compound containing an addition polymerizable ethylenically unsaturated bond which can be used in the ink composition of the invention include esters between an unsaturated carboxylic acid (for example, acrylic acid, methacrylic acid, itaconic acid, crotonic acid, isocrotonic acid, or maleic acid) and an aliphatic polyhydric alcohol compound and amides between the foregoing unsaturated carboxylic acid an aliphatic polyhydric amine compound.

Specific examples of monomers of an ester between an aliphatic polyhydric alcohol compound and an unsaturated carboxylic acid are as follows. That is, examples of acrylic esters include ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, and polyester acrylate oligomers.

Examples of methacrylic esters include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy) phenyl]dimethylmethane, and bis[p-(acryloxyethoxy)phenyl]dimethylmethane. Examples of itaconic esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of crotonic esters include ethylene glycol dicrotonate, tetramethylene glycol dicrotonate, pentaerythritol dicrotonate, and sorbitol tetradicrotonate. Examples of isocrotonic esters include ethylene glycol diisocrotonate, pentaerythritol diisocrotonate, and sorbitol tetraisocrotonate. Examples of maleic esters include ethylene glycol dimaleate, triethylene glycol dimaleate, pentaerythritol dimaleate, and sorbitol tetramaleate. In addition, mixtures of the foregoing ester monomers can be illustrated. Also, specific examples of monomers between an aliphatic polyhydric amine compound and an unsaturated carboxylic acid include methylene bis-acrylamide, methylene bis-methacrylamide, 1,6-hexamethylene bis-acrylamide, 1,6-hexamethylene bis-methacrylamide, diethylene triamine trisacrylamide, xylylene bisacrylamide, and xylylene bismethacrylamide.

As other examples, there are illustrated vinyl urethane compounds containing two or more polymerizable vinyl groups in one molecule thereof in which a hydroxyl group-containing vinyl monomer represented by the general formula (A): $CH_2=C(R)COOCH_2CH(R')OH$ (wherein R and R' each represents H or $CH_3$) is added to a polyisocyanate compound containing two or more isocyanate groups in one molecule thereof, as described in JP-B-48-41708.

Also, there can be illustrated polyfunctional acrylates and methacrylates such as urethane acrylates as described in JP-A-51-37193; polyester acrylates as described in JP-A-48-64183, JP-B-49-43191, and JP-B-52-30490; and epoxy acrylates resulting from a reaction between an epoxy resin and (meth)acrylic acid. In addition, compounds presented as photo curable monomers and oligomers in Journal of the Adhesion Society of Japan, Vol. 20, No. 7, pp. 300-308 (1984) can be used. In the invention, these monomers can be used in a chemical form of, for example, prepolymers, namely dimers, trimers, and oligomers, and mixtures or copolymers thereof.

The amount of use of the radical polymerizable compound is usually from 1 to 99.99%, preferably from 5 to 90.0%, more preferably from 10 to 70% (the term "%" means % by weight) with respect to the all components of the ink composition.

(e) <Photopolymerization Initiator>

Next, the photopolymerization initiator to be used in the radical polymerization based ink composition of the invention will be described hereinafter.

The photopolymerization initiator in the invention is a compound capable of generating a chemical change via an action of light or a mutual action with an electron excited state of a sensitizing dye to form at least one of radicals, acids and bases.

Preferred examples of the photopolymerization initiator include (a) aromatic ketones, (b) aromatic onium salt compounds, (c) organic peroxides, (d) hexaarylbiimidazole compounds, (e) keto oxime ester compounds, (f) borate compounds, (g) azinium compounds, (h) metallocene compounds, (i) active ester compounds, and (j) compounds containing a carbon-halogen bond.

<Coloring Agent>

The same coloring agents as have been described with respect to the cationic polymerization ink composition can be utilized.

In the ink composition of the invention, various additives may be used together depending upon the purpose. Such optional components will be described hereinafter.

<Sensitizing Dye>

In the invention, for the purpose of improving the sensitivity of the photopolymerization initiator, a sensitizing dye may be added. As the preferred sensitizing dye, there can be illustrated the following compounds which belong to the following compound groups and have an absorption wavelength in a region of from 350 nm to 450 nm: Polynuclear aromatic compounds (for example, pyrene, perylene, and triphenylene), xanthenes (for example, Fluororescein, Eosine, Erythrocin, Rhodamine B, and Rose Bengale), cyanines (for example, Thiacarbocyanine and Oxacarbocyanine), merocyanines (for example, merocyanine and carbomerocyanine), thiazines (for example, Thionine, Methylene Blue, and Toluidine Blue), acridines (for example, Acridine Orange, chloroflavin, and acriflavin), anthraquinones (for example, anthraquinone), squaryliums (for example, squarylium), and coumarins (for example, 7-diethylamino-4-methylcoumarin).

<Cosensitizer>

In addition, known compounds having actions such as an action to further improve the sensitivity and an action to suppress the polymerization inhibition due to oxygen may be added as a cosensitizer to an ink of the invention.

Examples of such a cosensitizer include compounds described in M. R. Sander, et al., *Journal of Polymer Society*, Vol. 10, p. 3173 (1972), JP-B-44-20189, JP-A-51-82102, JP-A-52-134692, JP-A-59-138205, JP-A-60-84305, JP-A-62-18537, JP-A-64-33104, and *Research Disclosure*, No. 33825. Specific examples thereof include triethanolamine, ethyl p-dimethylaminobenzoate, p-formyldimethylaniline, and p-methylthiodimethylaniline.

As other examples, there are illustrated thiols and sulfides, for example, thiol compounds described in JP-A-53-702, JP-B-55-500806, and JP-A-5-142772 and disulfide compounds described in JP-A-56-75643. Specific examples thereof include 2-methylmercaptobenzothiazole, 2-mercaptobenzoxazole, 2-methylmercaptobenzimidazole, 2-mercapto-4(3H)-quinazoline, and β-mercaptonaphthalene.

As other examples, there are illustrated amino acid compounds (for example, N-phenylglycine), organometallic compounds described in JP-B-48-42965 (for example, tributyl tin acetate), hydrogen donators described in JP-B-55-34414, sulfur compounds described in JP-A-6-308727 (for example, trithiane), phosphorus compounds described in JP-A-6-250387 (for example, diethyl phosphite), and Si—H and Ge—H compounds described in Japanese Patent Application No. 6-191605.

Also, from the viewpoint of enhancing the preservability, it is preferred to add a polymerization inhibitor in an amount of from 200 to 20,000 ppm. It is preferred that the ink for inkjet recording of the invention is made to have a low viscosity by heating at a temperature in the range of from 40 to 80° C. and then ejected. For the purpose of preventing head clogging by thermal polymerization, it is preferred to add a polymerization inhibitor. Examples of the polymerization inhibitor include hydroquinone, benzoquinone, p-methoxyphenol, TEMPO, TEMPOL, and cupferron Al.

<Others>

Besides, known compounds can be used as the need arises. For example, surfactants, leveling additives, matting agents, and polyester based resins, polyurethane based resins, vinyl based resins, acrylic resins, rubber based resins, and waxes for the purpose of adjusting film physical properties can be properly selected to use. Further, for the purpose of improving adhesion to a recording medium such as polyolefins and PET, it is also preferred to contain a tackifier which does not inhibit the polymerization. Specifically, the tackifier includes high molecular adhesive polymers described on pages 5 to 6 of JP-A-2001-49200 (for example, copolymers made of an ester between (meth)acrylic acid and an alcohol containing an alkyl group having from 1 to 20 carbon atoms, an ester between (meth)acrylic acid and an alicyclic alcohol having from 3 to 14 carbon atoms, or an ester between (meth)acrylic acid and an aromatic alcohol having from 6 to 14 carbon atoms); and low molecular tackiness-imparting resins containing a polymerizable unsaturated bond.

Further, for the purpose of improving adhesion to the recording medium, it is also effective to add an extremely trace amount of an organic solvent. In this case, it is effective to add the organic solvent in an amount within the range where problems in solvent resistance and VOC are not caused. Its amount is preferably in the range of from 0.1 to 5% by weight, more preferably from 0.1 to 3% by weight with respect to the weight of the entire ink composition.

Further, as a measure for preventing a lowering of the sensitivity due to a light shielding effect of the ink coloring material, it is also one of the preferred embodiments to form a radical/cation hybrid type curing ink by combining a cationic polymerizable monomer having a long life and a polymerization initiator.

<Aqueous Ink Composition>

An aqueous ink composition contains a polymerizable compound and a water-soluble photopolymerization initiator capable of generating a radical by the action of active energy rays. If desired, the aqueous ink composition may further contain a coloring material and the like.

<Polymerizable Compound>

As the polymerizable compound to be contained in an aqueous ink composition of the invention, polymerizable compounds which are contained in known aqueous ink compositions can be used.

In order to optimize a formulation while taking into account end user characteristics such as curing rate, adhesion and flexibility, a reactive material can be added to the aqueous ink composition. As such a reactive material, for example, (meth)acrylate (namely, acrylate and/or methacrylate) monomers and oligomers, epoxides, and oxetanes can be used.

Examples of the acrylate monomer include phenoxyethyl acrylate, octyldecyl acrylate, tetrahydrofurfuryl acrylate, isobornyl acrylate, hexanediol diacrylate, trimethylolpropane triacrylate, pentaerythritol triacrylate, polyethylene glycol diacrylates (for example, tetraethylene glycol diacrylate), dipropylene glycol diacrylate, tri(propylene glycol) triacrylate, neopentyl glycol diacrylate, bis(pentaerythritol) hexaacrylate, acrylates of an ethoxylated or propoxylated glycol and a polyol (for example, propoxylated neopentyl glycol diacrylate and ethoxylated trimethylolpropane triacrylate), and mixtures thereof. Examples of the acrylate oligomer include ethoxylated polyethylene glycol, ethoxylated trimethylolpropane acrylate, polyether acrylate and ethoxylated products thereof, and urethane acrylate oligomers.

Examples of the methacrylate include hexanediol dimethacrylate, trimethylolpropane trimethacrylate, triethylene glycol dimethacrylate, diethylene glycol dimethacrylate, ethylene glycol dimethacrylate, 1,4-butanediol dimethacrylate, and mixtures thereof.

The amount of addition of the oligomer is preferably from 1 to 80% by weight, more preferably from 1 to 10% by weight with respect to the whole weight of the ink composition.

<Water-Soluble Photopolymerization Initiator Capable of Generating a Radical by the Action of Active Energy Rays>

The polymerization initiator which can be used in the ink composition of the invention will be described hereinafter. As one example, there are illustrated photopolymerization initiators having a wavelength of up to approximately 400 nm. Examples of such a photopolymerization initiator include photopolymerization initiators represented by the following general formulae, which are a substance having functionality in a long wavelength region, namely sensitivity so as to generate a radical by irradiation with ultraviolet rays (hereinafter abbreviated as "TX base"). In the invention, it is especially preferred to properly select and use a compound from among these polymerization initiators.

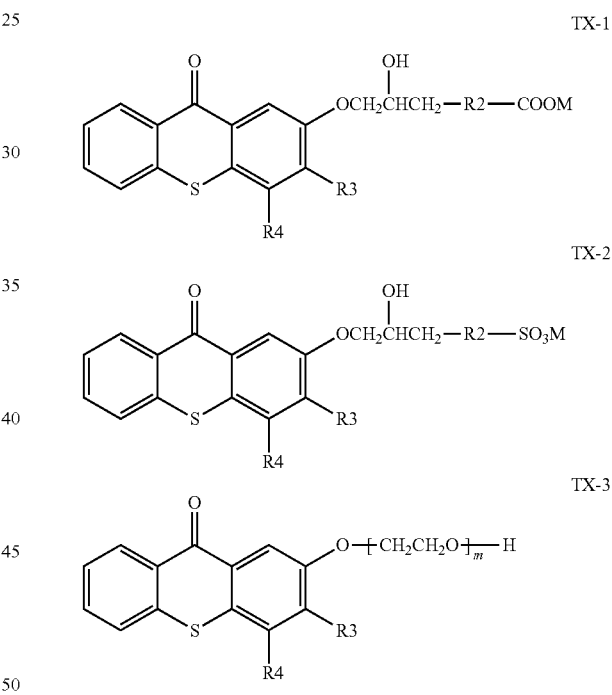

In the foregoing general formulae TX-1 to TX-3, R2 represents —(CH$_2$)$_x$— (wherein x represents 0 or 1), —O—(CH$_2$)$_y$— (wherein y represents 1 or 2), or a substituted or unsubstituted phenylene group. Further, when R2 represents a phenylene group, at least one of hydrogen atoms in the benzene ring may be substituted with one or two or more groups or atoms selected from, for example, a carboxyl group or a salt thereof, a sulfonic acid or a salt thereof, a linear or branched alkyl group having from 1 to 4 carbon atoms, a halogen atom (for example, fluorine, chlorine, or bromine), an alkoxyl group having from 1 to 4 carbon atoms, and an aryloxy group such as phenoxy group. M represents a hydrogen atom or an alkali metal (for example, Li, Na, or K). In addition, R3 and R4 each independently represents a hydrogen atom or a substituted or unsubstituted alkyl group. Here, examples of the alkyl group include linear or branched alkyl groups having from approximately 1 to 10 carbon atoms, especially from approximately 1 to 3 carbon atoms. Further, examples of the substituent of the alkyl group include a halogen atom (for example, a fluorine atom, a chlorine atom, or a bromine atom), a hydroxyl group, and an alkoxyl group (for example, alkoxyl groups having from approximately 1 to 3 carbon atoms). Also, m represents an integer of from 1 to 10.

In addition, in the invention, water-soluble derivatives of a photopolymerization initiator, IRGACURE 2959 (a trade name, manufactured by Ciba Specialty Chemicals) represented by the following general formulae (hereinafter abbreviated as "IC base") can be used. Specifically, photopolymerization initiators of the following formulae IC-1 to IC-3 can be used.

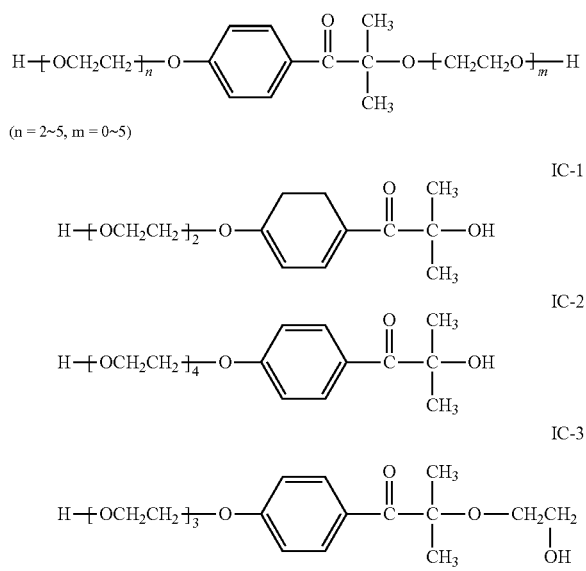

<Formulation for Clear Ink>

By forming the foregoing water-soluble polymerizable compound into a transparent aqueous ink without containing the foregoing coloring material therein, it is possible to prepare clear ink. In particular, by preparing the ink so as to have inkjet recording characteristics, a water-soluble curing type clear ink for inkjet recording is obtained. When such an ink is used which does not contain a coloring material therein, a clear film can be obtained. Examples of the utilization of the coloring material-free clear ink include use for undercoating for the purpose of imparting adaptability to image printing to a material to be recorded and use for overcoating for the purposes of surface protection of an image as formed by a usual ink and decoration and gloss impartation. In response to these uses, it is also possible to disperse a colorless pigment or fine particles not for the purpose of coloration, and the like. Addition of such substances serves to improve various characteristics such as image quality, fastness and processability (handling properties) of a printed matter.

With respect to the formulation condition in applying such a clear ink, it is preferred to prepare the ink so as to contain from 10 to 85% of the water-soluble polymerizable compound as the major component of the ink and from 1 to 10 parts by weight, based on 100 parts by weight of the water-soluble polymerizable compound, of the photopolymerization initiator (for example, an ultraviolet ray polymerization catalyst), with the photopolymerization initiator being contained in an amount of at least 0.5 part based on 100 parts of the ink.

<Material Construction in Coloring Material-Containing Ink>

In the case of using the foregoing water-soluble polymerizable compound for a coloring material-containing ink, it is preferred to adjust the concentrations of the polymerization initiator and the polymerizable substance in the ink adaptive to the absorption characteristics of the coloring material to be contained. As described previously, with respect to the blending amount, the amount of water or the solvent is made to fall within the range of from 40% to 90%, preferably from 60% to 75%, on the weight basis. In addition, the content of the polymerizable compound in the ink is in the range of from 1% to 30%, preferably from 5% to 20% on the weight basis with respect to the whole amount of the ink. The amount of the polymerization initiator depends upon the content of the polymerizable compound and is generally in the range of from 0.1 to 7%, preferably from 0.3 to 5%, on the weight basis with respect to the whole amount of the ink.

In the case where a pigment is used as the coloring material of the ink, the concentration of the pure pigment fraction in the ink is generally in the range of from 0.3% by weight to 10% by weight with respect to the whole amount of the ink. The coloring power of the pigment depends upon the dispersed state of the pigment particles. The range of from about 0.3 to about 1% is the range where the ink is used as an ink of a pale color. When the concentration exceeds this range, a concentration at which the ink is used for general coloration of colors is given.

<Preferred Physical Properties of Ink Composition>

Taking into account the ejection properties, an ink viscosity of the ink composition of the invention is preferably not more than 20 mpa·s, more preferably not more than 10 mPa·s at the temperature upon ejection. Further, it is preferred that a composition ratio is properly adjusted and determined such that the ink viscosity falls within the above-mentioned range.

A surface tension of the ink composition of the invention is preferably from 20 to 40 mN/m, more preferably from 25 to 35 mN/m. In the case of recording on various media to be recorded such as polyolefins, PET, coated papers, and non-coated papers, the surface tension of the ink composition of the invention is preferably 20 mN/m or more from the viewpoints of blurring and penetration, and it is preferably not more than 40 mN/m in view of wetting properties.

The thus adjusted ink composition of the invention is suitably used as an ink for inkjet recording. In the case of using the ink composition of the invention as an ink for inkjet recording, the ink composition is ejected onto a recording medium by an inkjet printer, and, thereafter, the ejected ink composition is irradiated with active energy rays to cure, thereby achieving recording.

Since a printed matter obtained from this ink has an image area which has been cured by irradiation with active energy rays such as ultraviolet rays and has excellent strength, it can be used for various uses such as the formation of an ink receiving layer (image area) of a lithographic printing plate other than the formation of an image by the ink.

What is claimed is:

1. An image-forming method comprising recording an image including a plurality of pixels with an image-forming material which does not completely permeate into a recording medium so as to have a thickness on the recording medium, the image-forming method further comprising:

setting an intended thickness of the image-forming material on the recording medium for each pixel;

calculating an existing thickness corresponding to an existing application amount of the image-forming material for expressing each color space coordinate component of color space data at each pixel; and determining an application amount for each color by comparing of the intended thickness with the existing thickness at each pixel to adjust the color space coordinate component so as to attain the intended thickness while keeping the same color; and wherein the determining of the application amount for each color includes: selecting a minimum intended thickness of a pixel having a minimum thickness and a maximum intended thickness of a pixel having a maximum thickness from thicknesses determined in the determining of the intended thickness; adjusting critical values for adjusting balance between color plates by bringing the existing thickness as close as possible to the intended thickness at each of the pixel having the minimum thickness and the pixel having the maximum thickness while keeping the same color; and adjusting a thickness at each pixel by applying to the intended thickness for each pixel an adjusting ratio determined in the adjusting of the critical values.

2. The image-forming method according to claim 1, wherein the intended thickness is determined by performing colorimetry of an image formed based on the color space data to convert to color space data having a luminance value as a parameter, and carrying out an operation based on the converted luminance value.

3. An image-forming apparatus comprising:

a material-applying section that applying an image-forming material to a recording medium to record an image including a plurality of pixels, the image-forming material not completely permeating into the medium so as to have a thickness on the recording medium;

a setting section that sets an intended thickness of the image-forming material on the recording medium for each pixel;

an existing thickness-calculating section that calculates an existing thickness corresponding to an existing application amount of the image-forming material for expressing each color space coordinate component of color space data at each pixel;

a determining section that determines an application amount for each color by comparing of the intended thickness with the existing thickness at each pixel to adjust the color space coordinate component so as to attain the intended thickness while keeping the same color; and a head-controlling section that controls the material-applying section based on the color space data adjusted in the determining section and wherein the determining section includes: a critical value-selecting section that selects a minimum intended thickness of a pixel having a minimum thickness and a maximum intended thickness of a pixel having a maximum thickness from thicknesses determined in the determining section; a critical-value adjusting section that adjusts critical values for adjusting balance between color plates by bringing the existing thickness as close as possible to the intended thickness at each of the pixel having the minimum thickness and the pixel having the maximum thickness while keeping the same color, and a thickness-adjusting section that adjusts a thickness at each pixel by applying to the intended thickness for each pixel an adjusting ratio determined in the adjusting of the critical values.

4. The image-forming apparatus according to claim 3, wherein the setting section includes: an inverse conversion section that performs colorimetry of an image formed based on the color space data to convert to color space data having a luminance value as a parameter: and an intended thickness-calculating section that carries out an operation based on the converted luminance value to determine the intended thickness.

* * * * *